US012658026B2

(12) United States Patent
Honnungar et al.

(10) Patent No.: US 12,658,026 B2
(45) Date of Patent: Jun. 16, 2026

(54) ARTIFICIAL INTELLIGENCE BASED RESOLUTION OF SECURITY ALARM EVENTS USING VIDEO DATA

(71) Applicant: HAKIMO INC., Menlo Park, CA (US)

(72) Inventors: Sagar Kashinath Honnungar, Mountain View, CA (US); Samuel Joseph, Menlo Park, CA (US)

(73) Assignee: HAKIMO INC., Menlo Park, CA (US)

( * ) Notice: Subject to any disclaimer, the term of this patent is extended or adjusted under 35 U.S.C. 154(b) by 266 days.

(21) Appl. No.: 18/500,667

(22) Filed: Nov. 2, 2023

(65) Prior Publication Data

US 2025/0148903 A1 May 8, 2025

(51) Int. Cl.
*G08B 29/18* (2006.01)
*G08B 13/196* (2006.01)

(52) U.S. Cl.
CPC ..... *G08B 29/185* (2013.01); *G08B 13/19602* (2013.01); *G08B 13/19673* (2013.01)

(58) Field of Classification Search
None
See application file for complete search history.

(56) References Cited

U.S. PATENT DOCUMENTS 9,013,294 B1 * 4/2015 Trundle ............... G08B 25/001 340/522
11,164,415 B1 * 11/2021 Reynolds, III ............ G06T 7/73
11,706,391 B1 * 7/2023 Heywood ............ G08B 25/006 348/158
11,735,021 B2 * 8/2023 Pourmohammad .... G06N 20/00 706/12
2018/0315300 A1 * 11/2018 Subramanian ......... G08B 31/00
2019/0035242 A1 * 1/2019 Vazirani ........... G08B 13/19695
2019/0156191 A1 * 5/2019 Cordes .................... G08B 31/00
2019/0244492 A1 * 8/2019 Horgan .................. G08B 13/08
2020/0135008 A1 * 4/2020 Horgan ................ G08B 29/185
2020/0160690 A1 * 5/2020 Kurani .................... G08B 25/14
2020/0202136 A1 * 6/2020 Shrestha .......... G08B 13/19613
2021/0012115 A1 * 1/2021 Bodbyl ................ G06V 20/176
(Continued)

FOREIGN PATENT DOCUMENTS

| | | | | |
|---|---|---|---|---|
| CA | 3044263 C * | 3/2021 | ........... | G08B 27/001 |
| KR | 102570343 B1 * | 8/2023 | ............. | G06F 21/31 |
| WO | WO-2020185412 A2 * | 9/2020 | ....... | G08B 13/19656 |

*Primary Examiner* — Ricky Chin
(74) *Attorney, Agent, or Firm* — CHIP LAW GROUP

(57) ABSTRACT

An electronic device for artificial intelligence (AI) based resolution of security alarm events using video data is provided. The electronic device receives alarm data related to an alarm event associated with a point of access to a physical area of a premises. The electronic device transmits a video data request corresponding to the received alarm data. The electronic device receives the video data corresponding to the received alarm data. The electronic device determines a tag associated with the alarm event based on at least one of the received video data or the received alarm data. The electronic device applies an AI model on the determined one tag and the received alarm data. The electronic device determines a severity score indicating a level of authenticity of the alarm event. The electronic device controls rendering of information corresponding to the alarm event on a user interface based on the determined severity score.

18 Claims, 12 Drawing Sheets

(56) References Cited

U.S. PATENT DOCUMENTS

| | | | | |
|---|---|---|---|---|
| 2021/0064885 | A1* | 3/2021 | Mori | G06V 20/62 |
| 2022/0051548 | A1* | 2/2022 | Pellegrini | H04M 3/436 |
| 2022/0157139 | A1* | 5/2022 | Subramany | G08B 13/19654 |
| 2022/0335796 | A1* | 10/2022 | Mercado | H04W 4/80 |
| 2022/0392317 | A1* | 12/2022 | Scalisi | H04L 12/2818 |
| 2023/0410519 | A1* | 12/2023 | Koga | G06V 40/15 |
| 2024/0071191 | A1* | 2/2024 | Mullins | G08B 13/19613 |
| 2024/0177582 | A1* | 5/2024 | Goyal | G06V 10/764 |
| 2024/0273411 | A1* | 8/2024 | Mueck | H04L 9/3263 |
| 2024/0404296 | A1* | 12/2024 | Sah | G06V 20/58 |
| 2025/0005987 | A1* | 1/2025 | Wright | G07C 9/00571 |
| 2025/0069400 | A1* | 2/2025 | Kelly | G06T 7/73 |
| 2025/0140103 | A1* | 5/2025 | Rajkovic | G06F 3/0488 |
| 2025/0148903 | A1* | 5/2025 | Honnungar | G08B 13/19602 |
| 2025/0175583 | A1* | 5/2025 | Rose | H04L 65/1108 |

* cited by examiner

900

| | STATUS | SEVERITY SCORE | TYPE OF ALARM EVENT | TIME STAMP | LOCATION |
|---|---|---|---|---|---|
| 902A | PENDING | 75 | DOOR-FORCED -OPEN | DATE-TIME-1 | LOCATION 1, GATE 1 |
| 902B | RESOLVED | 15 | DOOR-FORCED -OPEN | DATE-TIME-2 | LOCATION 2, GATE 2 |
| 902C | PENDING | 80 | DOOR-HELD -OPEN | DATE-TIME-3 | LOCATION 3, GATE 3 |
| 902D | RESOLVED | 20 | DOOR-HELD -OPEN | DATE-TIME-4 | LOCATION 4, GATE 4 |
| 902E | RESOLVED | 20 | INVALID BADGE | DATE-TIME-5 | LOCATION 5, GATE 5 |
| 902F | PENDING | 65 | INVALID BADGE | DATE-TIME-6 | LOCATION 6, GATE 6 |
| 902G | PENDING | 80 | INVALID ACCESS LEVEL | DATE-TIME-7 | LOCATION 7, GATE 7 |

FIG 9

ARTIFICIAL INTELLIGENCE BASED RESOLUTION OF SECURITY ALARM EVENTS USING VIDEO DATA

FIELD

Various embodiments of the disclosure relate to automatic resolution of security alarm events. More specifically, various embodiments of the disclosure relate to an electronic device and method for artificial intelligence based resolution of security alarm events using video data.

BACKGROUND

Enterprises and organizations of all sizes may use conventional access control systems to secure doors or entry points of buildings and ensure that only authorized persons can enter the buildings. Such access control systems typically use a combination of access control devices such as card readers, biometric sensors, and electronic locks to regulate access to secured areas in the building. While such access control systems have proven effective in preventing unauthorized access to the building, they still require human intervention to monitor and respond to alarms generated by the access control systems. Typically, physical security operators may be deployed in the building to monitor the alarms from the access control systems and manually check video feeds from cameras located near the entry points or the doors to ensure that no unauthorized individual enters the building. However, use of such conventional access control systems and reliance on the physical security operator to monitor the alarms may be time-consuming and prone to human errors, and thus, can result in a security breach going undetected.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for artificial intelligence based resolution of security alarm events using video data is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 9 is a diagram that illustrates an exemplary table including first information that may be rendered on a user interface, in accordance with an embodiment of the disclosure.

DETAILED DESCRIPTION

Figure 1:
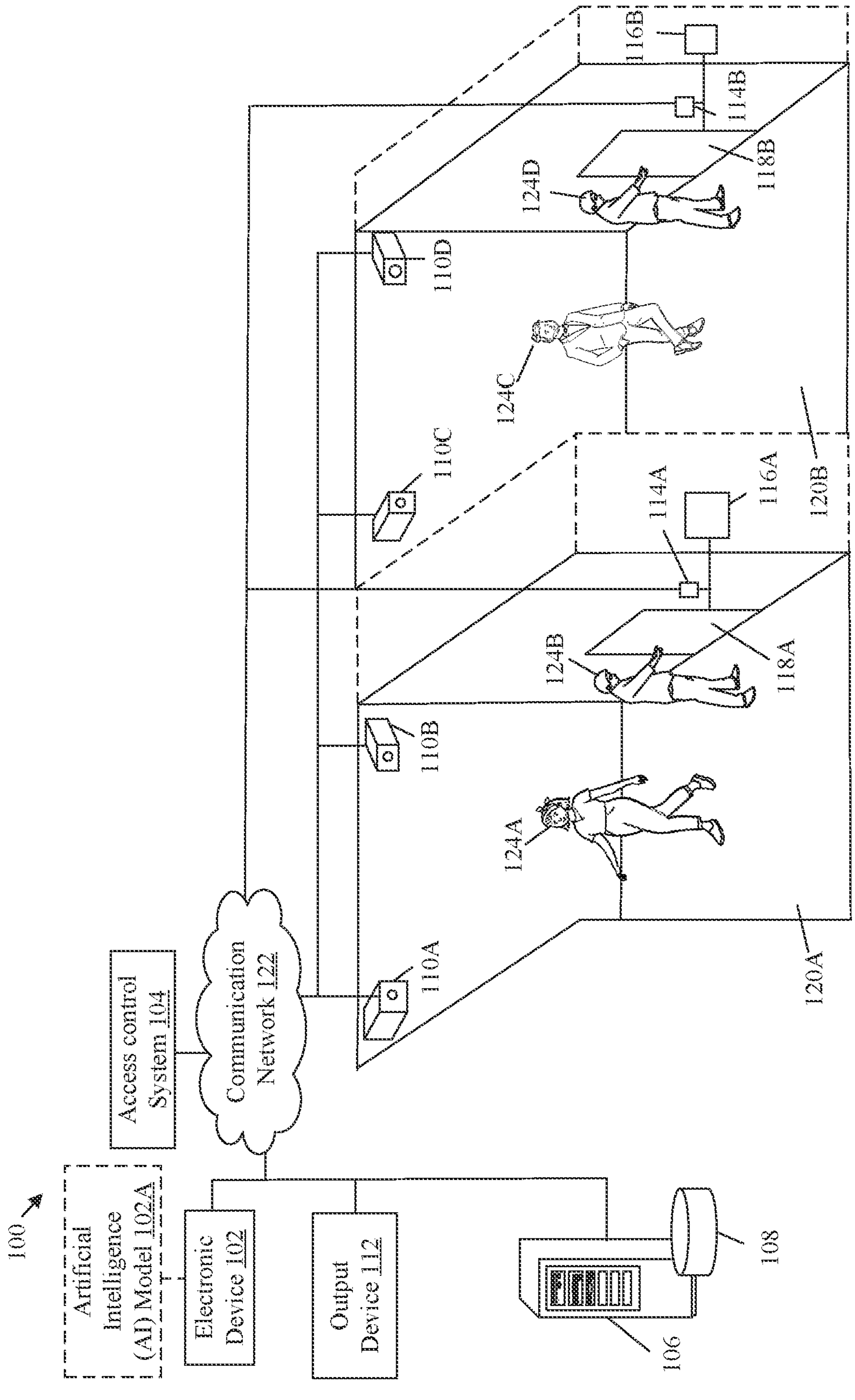
FIG. 1 is a block diagram that illustrates an exemplary network environment for artificial intelligence based resolution of security alarm events using video data, in accordance with an embodiment of the disclosure.

The following described implementations may be found in the disclosed electronic device and method for artificial intelligence based resolution of security alarm events using video data. Exemplary aspects of the disclosure may provide an electronic device (for example, a server, a workstation, or a mobile device) that may be configured to receive alarm data related to an alarm event associated with a point of access (for example, a door, a gate, or a turnstile). The point of access may be an entry or exit (or an internal door) of a physical area (for example, a room, an office space, or an elevator) of a premises (for example, an office building, a hospital, a shopping mall, or an apartment complex). The electronic device may be configured to receive the alarm data from an access control system that may be communicably coupled to a lock system (for example, an electronic lock that supports a biometric or badge-based authentication) for the point of access. The access control system may be a security system designed to regulate and manage entry into or exit from the physical area. The alarm data may include, for example, at least one of a type of the alarm event or a time of occurrence of the alarm event. The type of the alarm event may include, for example, one of a door-forced-open (DFO) event, a door-held-open (DHO) event, an invalid access level event, an invalid badge event, or a hardware fault event. The DFO event may be an event in which the access control system may determine that the point of access is opened without a valid credential. The DHO event may be an event in which the access control system may determine that the point of access is kept open for a specific period of time or more. The invalid access level event may be an event in which the access control system may determine that a person who has attempted to open the point of access does not have a proper access level to the physical area. The invalid badge event may be an event in which the access control system may be configured to determine that an invalid credential is provided by the person to open the point of access. The hardware fault event may be an event caused as a result of a malfunction or fault in hardware of the access control system and/or the security fitments in the physical area.

The electronic device may be configured to transmit a request for video data corresponding to the received alarm data to one of a server or at least one imaging device (for example, a digital camera, a thermal imaging camera, and the like). The electronic device may be configured to receive the video data from the one of the server or the at least one imaging device based on the transmitted request. The electronic device may be configured to determine at least one tag associated with the alarm event based on at least one of the received video data or the received alarm data. The at least one tag may indicate one of an entry of at least one person through the point of access, an exit of the at least one person through the point of access, a loitering of the at least one person on a secure side of the point of access, or a loitering of the at least one person on an unsecure side of the point of access. The electronic device may be configured to determine a severity score indicating a level of authenticity of the alarm event, by application of an artificial intelligence (AI) model on the determined at least one tag and the received alarm data. The electronic device may be configured to control, based on the determined severity score, rendering of first information corresponding to the alarm event on a user interface. The first information may include one of second information indicating a resolution of the alarm event or third information indicating the alarm event is pending for review for an operator associated with the premises.

Despite various security measures, a risk that a security breach goes undetected may remain a common problem for most enterprises. Typically, physical security operators may be deployed in a building to monitor alarms from access control systems and manually check video feeds from cameras located near entry points or doors to ensure that no unauthorized individual enters the building. However, the physical security operators may experience alarm fatigue from a large number of false alarms that need to be monitored from such access control systems because of faulty or poor configuration of components of the access control systems. As a result, the physical security operators may fail to recognize true alarms among the deluge of the false alarms, which can result in a security breach going undetected. In other words, due to the sheer number of security alarm events that may occur in a given day, the physical security operators may have to go through several video footages and may thereby be overwhelmed. A majority of such security alarm events may turn out to be false alarms that may be triggered due to various reasons such as, faults in the access control system, suspicious looking activity of benign employees, and the like. As the physical security operators may be overwhelmed, the physical security operators may overlook certain high risk events. For example, tailgating or loitering by outsiders in certain secure areas may get overlooked by the physical security operators burdened with monitoring hours of uneventful video footage. Thus, the organizations may be vulnerable to problems such as sensitive data breach, asset loss, and personnel harm.

In order to address the aforesaid issues, the disclosed electronic device and method may determine at least one tag associated with an alarm event based on at least one of alarm data related to the alarm event or video data corresponding to the alarm data. The disclosed electronic device may determine a severity score indicating a level of authenticity of the alarm event by application of an artificial intelligence (AI) model based on the determined at least one tag and the alarm data. The disclosed electronic device may control rendering of information indicating a resolution of the alarm event in a case where the determined severity score is less than a threshold score. Further, the disclosed electronic device may control rendering of information indicating the alarm event is pending for review for an operator in a case where the determined severity score is greater than the threshold score. The present disclosure provides a cost-effective solution that enhances the security of a physical area by automatic identification of false alarm events and true alarm events, and automatic resolution of the false alarm events. Thus, the present disclosure may reduce a risk of undetected true alarm events, and enhance the overall security of the enterprises by automatic reduction of the number of false alarms to be notified to the operator. Further, real-time information may be provided to the operator to indicate an occurrence of true or genuine alarm events. Also, alarm fatigue of the physical security operators may be reduced and the physical security operators may just monitor the automatically detected true alarm events instead of going through several uneventful video footages. This may also improve the alertness of the physical security operators and help detect security lapses in a timely manner.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a block diagram that illustrates an exemplary network environment for artificial intelligence based resolution of security alarm events, in accordance with an embodiment of the disclosure. With reference to FIG. 1, there is shown a network environment 100. The network environment 100 may include an electronic device 102, an access control system 104, a server 106, a database 108, a set of imaging devices 110A, 110B, 110C, and 110D, an output device 112, and a communication network 122. The electronic device 102 may be associated with an artificial intelligence (AI) model 102A. The electronic device 102 may communicate with the access control system 104, the server 106, the set of imaging devices 110A, 110B, 110C, and 110D, and the output device 112, via the communication network 122.

There is further shown in FIG. 1, a first physical area 120A and a second physical area 120B. The first physical area 120A may be, but is not limited to, an unrestricted area (for example, a lobby, a common room, a corridor, a reception, or a hallway) of a physical premises (for example, an office building, a hospital, a shopping mall, or an apartment complex). The second physical area 120B may be, but is not limited to, a restricted area (for example, a work area or a server room) of the physical premises. The network environment 100 may further include a first access credential reader 114A associated with a first point of access 118A (e.g., a door) to the second physical area 120B. Further, the network environment 100 may include a second access credential reader 114B associated with a second point of access 118B (e.g., a door) to the second physical area 120B. The network environment 100 may further include a first lock system 116A for the first point of access 118A and a second lock system 116B for the second point of access 118B. The access control system 104 may be communicably coupled to each of the first access credential reader 114A, the second access credential reader 114B, the first lock system 116A, and the second lock system 116B, via the communication network 122.

A person skilled in the art will understand that though the environment 100 of FIG. 1 includes two physical areas, two lock systems, two access credential readers, and two point of accesses, the scope of the disclosure is not limited to just two of each such component. The environment 100 may include more than two physical areas, lock systems, access credential readers, and point of accesses, without a departure from the scope of the disclosure. Further, though the environment 100 of FIG. 1 shows four imaging devices in the set of imaging devices, the scope of the disclosure is not so limited. The disclosure may be implemented using one imaging device or a plurality of imaging devices (including, for example, two, three, four, or more than four imaging devices), without a departure from the scope of the disclosure.

In FIG. 1, there is further shown a first person 124A, a second person 124B, a third person 124C, and a fourth person 124D. The first person 124A may loiter on an unsecure side of the first point of access 118A and the third person 124C may loiter on a secure side of the first point of access 118A. The unsecure side of the first point of access 118A may correspond to the first physical area 120A. The secure side of the first point of access 118A may correspond to the second physical area 120B. The second person 124B may enter into the second physical area 120B through the first point of access 118A. The entry of the second person 124B into the second physical area 120B may be defined as a movement of the second person 124B from the unsecure side of the first point of access 118A to the secure side of the first point of access 118A. The fourth person 124D may exit from the second physical area 120B through the second point of access 118B. The exit of the fourth person 124D from the second physical area 120B may be defined as a movement of the fourth person 124D from a secure side of the second point of access 118B to an unsecure side of the second point of access 118B. The secure side of the second point of access 118B may correspond to the second physical area 120B. The unsecure side of the second point of access 118B may correspond to any physical area that may be outside the second physical area 120B.

The electronic device 102 may include suitable logic, circuitry, interfaces, and/or code that may be configured to receive alarm data related to at least one alarm event associated with at least one of the first point of access 118A or the second point of access 118B, from the access control system 104. The electronic device 102 may transmit a request for video data corresponding to the received alarm data to the server 106 or at least one imaging device of the set of imaging devices 110A, 110B, 110C, and 110D. The electronic device 102 may receive the video data based on the transmitted request. The electronic device 102 may determine at least one tag associated with the at least one alarm event based on at least one of the received video data or the received alarm data. The electronic device 102 may apply the AI model 102A on the determined at least one tag and the received alarm data. The electronic device 102 may determine a severity score indicating a level of authenticity of the at least one alarm event, based on the application of the AI model 102A. The electronic device 102 may control rendering of first information corresponding to the at least one alarm event on a user interface of the output device 112, based on the determined severity score. Examples of the electronic device 102 may include, but are not limited to, a computing device such as a personal computer, a laptop, or a computer workstation, a server, or an edge device connected to an organization's network. A person with ordinary skill in the art will understand that the scope of the disclosure is not limited to an implementation of the electronic device 102 and the access control system 104 as separate entities. In accordance with an embodiment, the functionalities of the access control system 104 may be implemented by the electronic device 102, without departure from the scope of the disclosure.

The AI model 102A may include suitable logic, interfaces, and/or code that may be configured to detect at least one person (such as, the first person 124A, the second person 124B, the third person 124C, or the fourth person 124D) in the video data. The video data may be received from the server 106 or the at least one imaging device of the set of imaging devices 110A, 110B, 110C, and 110D. The AI model 102A may determine an activity of the detected at least one person in the video data. The AI model 102A may determine the at least one tag based on the determined activity of the detected at least one person. The AI model 102A may further determine the at least one tag based on the alarm data. The AI model 102A may determine the severity score based on the determined at least one tag or the alarm data. Details related to the determination of the at least one tag are further provided, for example, in FIG. 8.

The AI model 102A may be a pretrained neural network. A neural network may be referred to as a computational network or a system of artificial neurons which is arranged in a plurality of layers. The plurality of layers of the neural network may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network. Such hyper-parameters may be set before or after training the neural network on a training dataset.

Each node of the neural network may correspond to a mathematical function (e.g., a sigmoid function or a rectified linear unit) with a set of parameters that may be tunable during training of the neural network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to the same mathematical function or a different mathematical function. In training of the neural network, one or more parameters of each node of the neural network may be updated based on whether an output of the final layer for a given input (from the training dataset) matches a correct result based on a loss function for the neural network. The above process may be repeated for the same input or a different input until a minima of loss function is achieved, and a training error is minimized. Several methods for training are known in art, for example, gradient descent, stochastic gradient descent, batch gradient descent, gradient boost, meta-heuristics, and the like.

The AI model 102A may include electronic data, which may be implemented as, for example, a software component of an application that is executable on the electronic device 102. Also, the AI model 102A may rely on libraries, external scripts, or other logic or instructions for execution by a processing device. For example, the AI model 102A may rely on external code or software packages to execute machine learning tasks such as an analysis of a sequence of images in the video data for the detection of the activity of the at least one person (such as, the first person 124A, the second person 124B, the third person 124C, or the fourth person 124D), the determination of the at least one tag, and the determination of the severity score.

The AI model 102A may be implemented using hardware, including but not limited to, a processor, a microprocessor (e.g., to perform or control performance of one or more operations), a coprocessor (such as a Vision Processing Unit (VPU) or an Inference Accelerator), a field-programmable gate array (FPGA), or an application-specific integrated circuit (ASIC). Alternatively, the AI model 102A may be implemented using a combination of hardware and software. Examples of the AI model 102A may include, but are not limited to, a deep neural network (DNN), a hybrid architecture of multiple DNNs, a convolutional neural network (CNN), R-CNN, Fast R-CNN, Faster R-CNN, an artificial neural network (ANN), (You Only Look Once) YOLO network, CNN+ANN, a fully connected neural network, a deep Bayesian neural network, and/or a combination of such networks.

The access control system 104 may include suitable logic, circuitry, interfaces, and/or code that may be configured to receive first credential information from at least one of the first access credential reader 114A or the second access credential reader 114B. The first credential information may be associated with the at least one person (such as, the first person 124A, the second person 124B, the third person 124C, or the fourth person 124D). The first credential information may include, but is not limited to, identification information, a unique code, a PIN code, a password, and biometric information associated with the at least one person. The identification information may identify the at least one person or a credential device of the at least one person. The credential device may include, but is not limited to, a key fob, a smartphone, or an access badge (for example, a smart card, a key card, a proximity card, a radio frequency identification (RFID) card, or a magnetic stripe card). The access control system 104 may receive second credential information related to a list of authorized persons and access level information related to the list of authorized persons from the server 106. The access control system 104 may determine whether the first credential information matches with the second credential information. The access control system 104 may determine a validity of the first credential information associated with the at least one person based on the determination whether the first credential information matches with the second credential information.

The access control system 104 may grant or restrict access to a physical area (for example, the second physical area 120B) for the at least one person based on an application of predefined security policies and the determination of the validity. The access control system 104 may transmit a command to a lock system (such as, the first lock system 116A or the second lock system 116B) to open (or unlock) the lock system, in a case where the access control system 104 grants the access to the physical area. The access control system 104 may transmit access grant information that indicates an access granted event to the server 106. The access granted event may indicate the grant of the access to the physical area by the access control system 104. The access grant information that indicates the access granted event may be further transmitted to the electronic device 102.

The access control system 104 may detect an occurrence of an alarm event (such as, an invalid badge event or an invalid access level event) in a case where the access control system 104 may restrict the access to a physical area. The access control system 104 may receive a first signal indicating that a point of access (such as, the first point of access 118A or the second point of access 118B) is opened, from a lock system (such as, the first lock system 116A or the second lock system 116B). The access control system 104 may receive a second signal indicating that the point of access is closed. The access control system 104 may detect an occurrence of an alarm event (such as, a door forced open (DFO) event or a door held open (DHO) event) based on the first signal. The access control system 104 may generate and transmit alarm data related to the alarm event (such as, the DFO event, the DHO event, the invalid badge event, or the invalid access level event) to the electronic device 102. The access control system 104 may detect an occurrence of a resolving event corresponding to the alarm event. The resolving event may indicate a cancelation or a resolution of the alarm event. For example, the access control system 104 may detect the resolution or the cancelation of the alarm event based on the second signal. The resolving event may include, but is not limited to, a DFO canceled event or a DHO canceled event. The access control system 104 may transmit resolving event information that may indicate the resolving event to the electronic device 102.

The server 106 may include suitable logic, circuitry, interfaces, and/or code that may be configured to store video data from the set of imaging devices 110A, 110B, 110C, and 110D. The server 106 may further store information received from the access control system 104, the second credential information related to the list of authorized persons, and the access level information related to the list of authorized persons. For example, the information received from the access control system 104 may include access grant information or the alarm data. The server 106 may provide the second credential information related to the list of authorized persons and the access level information in response to a request from the access control system 104. The server 106 may provide the video data to the electronic device 102 in response to a request from the electronic device 102.

The server 106 may execute operations through web applications, cloud applications, HTTP requests, repository operations, file transfer, and the like. Example implementations of the server 106 may include, but are not limited to, a database server, a file server, a web server, an application server, a mainframe server, a cloud computing server, or a combination thereof. In at least one embodiment, the server 106 may be implemented as a plurality of distributed cloud-based resources by use of several technologies that are well known to those ordinarily skilled in the art. A person with ordinary skill in the art will understand that the scope of the disclosure may not be limited to the implementation of the server 106 and the access control system 104 as two separate entities. In certain embodiments, the functionalities of the server 106 can be incorporated in its entirety or at least partially in the access control system 104, without a departure from the scope of the disclosure. Further, the scope of the disclosure may not be limited to the server 106 (and/or the access control system 104) and the electronic device 102 as separate entities. In certain embodiments, the functionalities of the server 106 (and/or the access control system 104) can be incorporated in its entity or at least partially in the electronic device 102, without a departure from the scope of the disclosure.

The database 108 may include suitable logic, interfaces, and/or code that may be configured to store the video data from the set of imaging devices 110A, 110B, 110C, and 110D, the information received from the access control system 104, the second credential information related to the list of authorized persons, and the access level information related to the list of authorized persons. The database 108 may be a relational database, a non-relational database, or a set of files stored in conventional or big-data storage. In an embodiment, the database 108 may be stored or cached on a device, such as the server 106. The device storing the database 108 may receive a request for the video data from the electronic device 102. In response, the device of the database 108 may retrieve and provide the requested video data to the electronic device 102. The device storing the database 108 may receive a request for data from the access control system 104. In response, the device of the database 108 may be configured to retrieve and provide the requested data to the access control system 104. Operations of the database 108 may be executed using hardware including a processor, a microprocessor (e.g., to perform or control performance of one or more operations), a field-programmable gate array (FPGA), or an application-specific integrated circuit (ASIC).

The set of imaging devices 110A, 110B, 110C, and 110D may include suitable logic, circuitry, and interfaces that may be configured to capture a video of at least one of the first physical area 120A or the second physical area 120B. The captured video may include, for example, at least one of the first point of access 118A, the second point of access 118B, or the at least one person in the vicinity of the first point of access 118A or the second point of access 118B. Examples of the set of imaging devices 110A, 110B, 110C, and 110D may include, but are not limited to, an image sensor, a wide-angle camera, an action camera, a closed-circuit television (CCTV) camera, a camcorder, a camera with an integrated depth sensor, a cinematic camera, Digital Single-Lens Reflex (DSLR) camera, a Digital Single-Lens Mirrorless (DSLM) camera, a digital camera, a camera phone, a time-of-flight camera (ToF camera), a night-vision camera, and/or other image capturing devices.

In FIG. 1, there is shown the first point of access 118A and the second point of access 118B that may be in a field of view of at least one imaging device of the set of imaging devices 110A, 110B, 110C, and 110D. However, the disclosure may not be limited to presence of only four imaging devices in the built environment. In some embodiments, a greater number of imaging devices may be installed to cover the first point of access 118A and the second point of access 118B from different viewpoints, without a departure from the scope of the disclosure.

The output device 112 may include suitable logic, circuitry, and interfaces that may be configured to display the first information corresponding to the at least one alarm event. In at least one embodiment, the output device 112 may be a display screen which enables a user to provide a user input via the output device 112. The output device 112 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the output device 112 may refer to a display screen of a head mounted device (HMD), a smart-glass device, a see-through display, a projection-based display, an electro-chromic display, or a transparent display.

The first access credential reader 114A and the second access credential reader 114B may be, but are not limited to, a keypad reader that requires a person to enter a secret code or PIN via a keypad to gain entry to a physical area (such as, the first physical area 120A or the second physical area 120B) or a card reader that may acquire the first credential information from the access badge of the person. In another scenario, the first access credential reader 114A and the second access credential reader 114B may be a key fob reader that may acquire the first credential information from the key fob of the person, or a biometric scanner that may acquire the biometric information such as fingerprints, facial recognition, or iris scans of the person. In another scenario, the first access credential reader 114A and the second access credential reader 114B may be an electronic reader that may acquire the first credential information from a credential device (such, as a mobile phone, a wearable device, or a laptop), or an intercom system that requires the person to communicate with a security personnel via the intercom system for identity verification. The first access credential reader 114A may transmit location information associated with the first point of access 118A to the access control system 104. The second access credential reader 114B may transmit location information associated with the second point of access 118B to the access control system 104. The location information associated with the first point of access 118A may include, for example, an identification number or a name assigned to at least one of the first point of access 118A or the second physical area 120B. Similarly, the location information associated with the second point of access 118B may include, for example, an identification number or a name assigned to at least one of the second point of access 118B or the second physical area 120B.

The first lock system 116A and the second lock system 116B may include, for example, one or more locking devices to manage access to the first point of access 118A and the second point of access 118B, respectively. Each locking device may use electric current to operate an actuator that may actuate a locking mechanism by use of magnets, solenoids, or motors. The first lock system 116A and the second lock system 116B may operate the one or more locking devices based on the command from the access control system 104.

The first lock system 116A and the second lock system 116B may further include one or more sensors that may detect whether a point of access (such as, the first point of access 118A or the second point of access 118B) is opened or closed. The first lock system 116A and the second lock system 116B may transmit, to the access control system 104, the first signal that indicates the point of access (such as, the first point of access 118A or the second point of access 118B) is opened or the second signal that indicates that the point of access is closed. The one or more sensors may include, but are not limited to, contact sensors, motion sensors, reed switches, magnetic door switches, and infrared sensors.

The first point of access 118A and the second point of access 118B may correspond to a physical barrier that may allow a two-way access or a one-way access to the second physical area 120B. Examples of the first point of access 118A and the second point of access 118B may include, but are not limited to, a door, a gate, or a turnstile.

The communication network 122 may include a communication medium through which the electronic device 102, the access control system 104, the server 106, the set of imaging devices 110A, 110B, 110C, and 110D, the output device 112, the first access credential reader 114A, the second access credential reader 114B, the first lock system 116A, and the second lock system 116B may communicate with each other. The communication network 122 may include one of a wired connection or a wireless connection. Examples of the communication network 122 may include, but are not limited to, the Internet, a cloud network, a Cellular or Wireless Mobile Network (such as a Long-Term Evolution and 5G New Radio), a satellite network (e.g., a network of a set of low earth satellites), a Wireless Fidelity (Wi-Fi) network, a Personal Area Network (PAN), a Local Area Network (LAN), or a Metropolitan Area Network (MAN).

Various devices in the network environment 100 may be configured to connect to the communication network 122 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the access control system 104 may detect an occurrence of at least one alarm event (such as, the DFO event, the DHO event, the invalid access level event, or the invalid badge event) and generate alarm data related to the at least one alarm event. The alarm data may include at least one of a type of the at least one alarm event or a time of occurrence of the at least one alarm event. Details related to the generation of the alarm data are further provided, for example, in FIG. 3 (at 302). The access control system 104 may transmit the alarm data to the electronic device 102. The electronic device 102 may receive the alarm data related to the at least one alarm event from the access control system 104. Details related to the reception of the alarm data are further provided, for example, in FIG. 3 (at 302).

The electronic device 102 may transmit the request for the video data corresponding to the received alarm data to the server 106 (or the database 108, via the server 106) or the at least one imaging device of the set of imaging devices 110A, 110B, 110C, and 110D. For example, the electronic device 102 may transmit the request for the video data corresponding to the time of occurrence of the at least one alarm event. Details related to the transmission of the request for the video data are further provided, for example, in FIG. 3 (at 304).

The electronic device 102 may receive the requested video data based on the transmitted request. The received video data may include, for example, at least one of the first point of access 118A, the second point of access 118B, or the at least one person in the vicinity of the first point of access 118A or the second point of access 118B. Details related to the reception of the requested video data are further provided, for example, in FIG. 3 (at 306).

The electronic device 102 may apply the AI model 102A on the received video data to determine the activity of the at least one person in the video data. The activity of the at least one person may include, for example, a movement of the at least person in the vicinity of the first point of access 118A or the second point of access 118B. The electronic device 102 may determine the at least one tag based on at least one of the determined activity of the detected at least one person or the received alarm data. Details related to the determination of the activity and the determination of the at least one tag are further provided, for example, in FIG. 3 (at 308).

The electronic device 102 may apply the AI model 102A on the determined at least one tag and the received alarm data to determine the severity score indicating the level of authenticity of the at least one alarm event. Details related to the determination of the severity score are further provided, for example, in FIG. 3 (at 310 and 312). The electronic device 102 may control the rendering of the first information corresponding to the at least one alarm event on the user interface of the output device 112, based on the determined severity score. The first information may include one of second information indicating a resolution of the at least one alarm event or third information indicating the at least one alarm event is pending for review for an operator associated with the premises. The electronic device 102 may control rendering of the second information in a case where the determined severity score is less than or equal to a threshold score. The electronic device may control rendering of the third information in a case where the determined severity score is greater than the threshold score. Details related to the control of the rendering of the first information are further provided, for example, in FIG. 3 (at 314).

Figure 2:
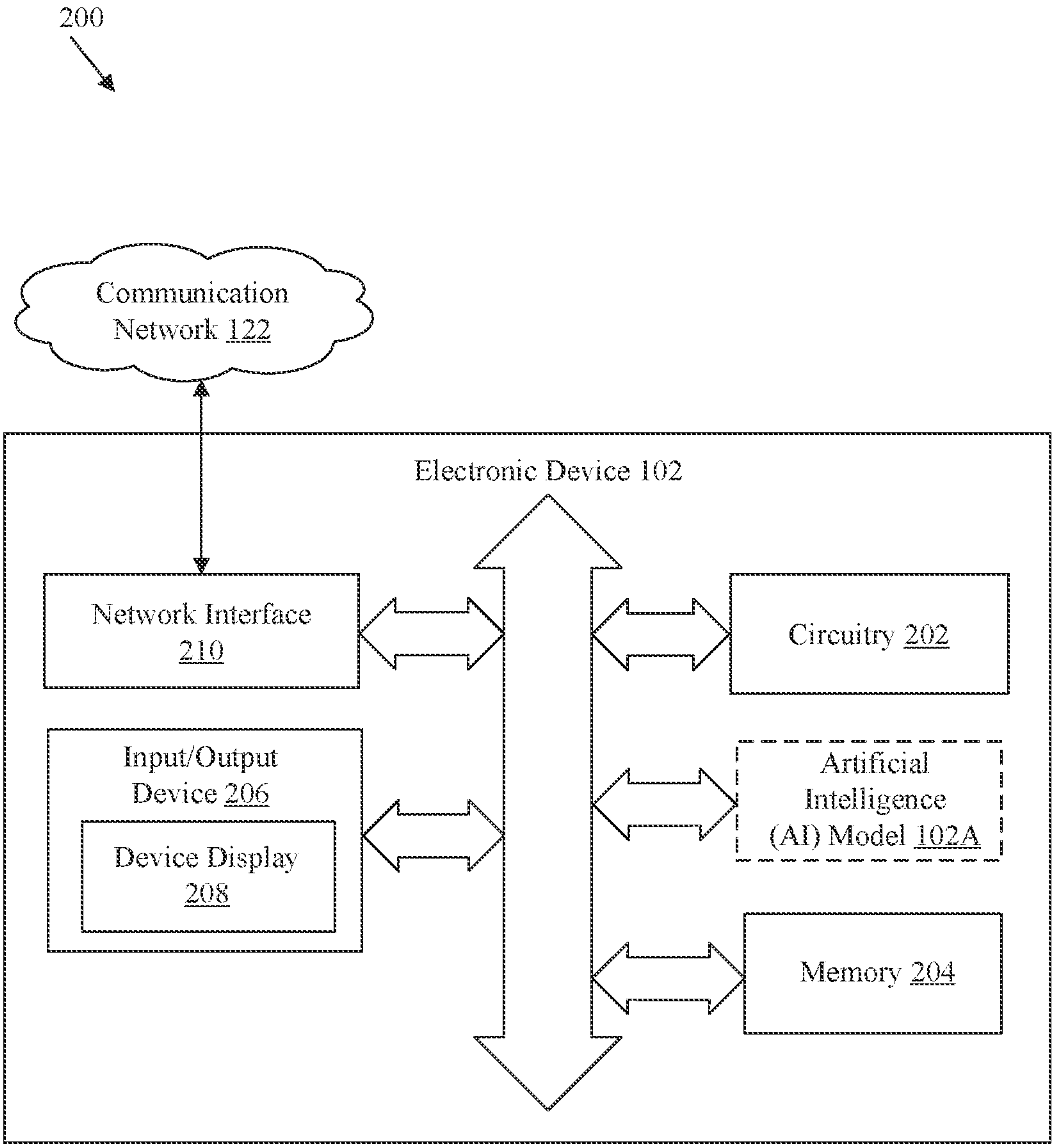
FIG. 2 is a block diagram that illustrates an exemplary electronic device of FIG. 1, in accordance with an embodiment of the disclosure.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, a display device 208, a network interface 210, and the AI model 102A. In at least one embodiment, the I/O device 206 may also include a display device 208. The circuitry 202 may be communicatively coupled to the memory 204, the I/O device 206, and the network interface 210 through wired or wireless communication of the electronic device 102.

A person of ordinary skill in the art will understand that the block diagram 200 of the electronic device 102 may also include other suitable components or electronic devices, in addition to the components or electronic devices which are illustrated herein to describe and explain the function and operation of the present disclosure. Detailed description of such components or electronic devices has been omitted from the disclosure for the sake of brevity.

The circuitry 202 may include suitable logic, circuitry, and/or interfaces code that may be configured to execute program instructions associated with different operations to be executed by the electronic device 102. For example, the operations may include alarm data reception, video data request transmission, video data reception, tag determination, AI model application, severity score determination, and control of first information rendering. The circuitry 202 may include any suitable special-purpose or general-purpose computer, computing entity, or processing device including various computer hardware or software modules and may be configured to execute instructions stored on any applicable computer-readable storage media. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 202 may include any number of processors configured to, individually or collectively, perform or direct performance of any number of operations of the electronic device 102, as described in the present disclosure. Examples of the circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store the program instructions executable by the circuitry 202 to perform operations of the circuitry 202 (and/or the electronic device 102). In at least one embodiment, the memory 204 may be configured to store, for example, the received video data, the received alarm data, the received access grant information, the determined severity score, and the first information. In certain embodiments, the AI model 102A may be stored in the memory 204. Example implementations of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a user input indicative of instructions for configuration of the access control system 104, configuration of the access credential readers, configuration of the lock systems, configuration of the imaging devices, and configuration of the AI model 102A in the network environment 100. In an example, the I/O device 206 may render the first information including for example, the second information (i.e., an indication of an auto-resolution of the alarm event) or the third information (i.e., an indication that the alarm event is not auto-resolved and is pending operator review), based on the determination of the severity score associated with the alarm event. The I/O device 206 may include one or more input and output devices that may communicate with different components of the electronic device 102. For example, the I/O device 206 may receive user inputs to trigger execution of program instructions associated with different operations to be executed by the output device 112. Examples of the I/O device 206 may include, but are not limited to, a touch screen, a keyboard, a mouse, a joystick, a microphone, the display device 208, and a speaker.

The network interface 210 may include suitable logic, circuitry, and interfaces that may be configured to facilitate communication between the electronic device 102, and other devices of the network environment 100, for example, the access control system 104, the server 106, the set of imaging devices 110A, 110B, 110C, and 110D, and the output device 112, via the communication network 122. The network interface 210 may be implemented by use of various known technologies to support wired or wireless communication of the electronic device 102 with the communication network 122. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 210 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global Electronic device for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a near field communication protocol, a wireless pear-to-pear protocol, a protocol for email, instant messaging, and a Short Message Service (SMS).

The I/O device 206 may include the display device 208. The display device 208 may include suitable logic, circuitry, and interfaces that may be configured to receive inputs from the circuitry 202 to render, on a display screen, the first information based on the determined severity score. In an embodiment, the display device 208 may correspond to the output device 112. The display device 208 may be a touch screen which may enable the operator to provide a user-input via the display device 208. The touch screen may be at least one of a resistive touch screen, a capacitive touch screen, or a thermal touch screen. The display device 208 may be realized through several known technologies such as, but not limited to, at least one of a Liquid Crystal Display (LCD) display, a Light Emitting Diode (LED) display, a plasma display, or an Organic LED (OLED) display technology, or other display devices.

Figure 3:
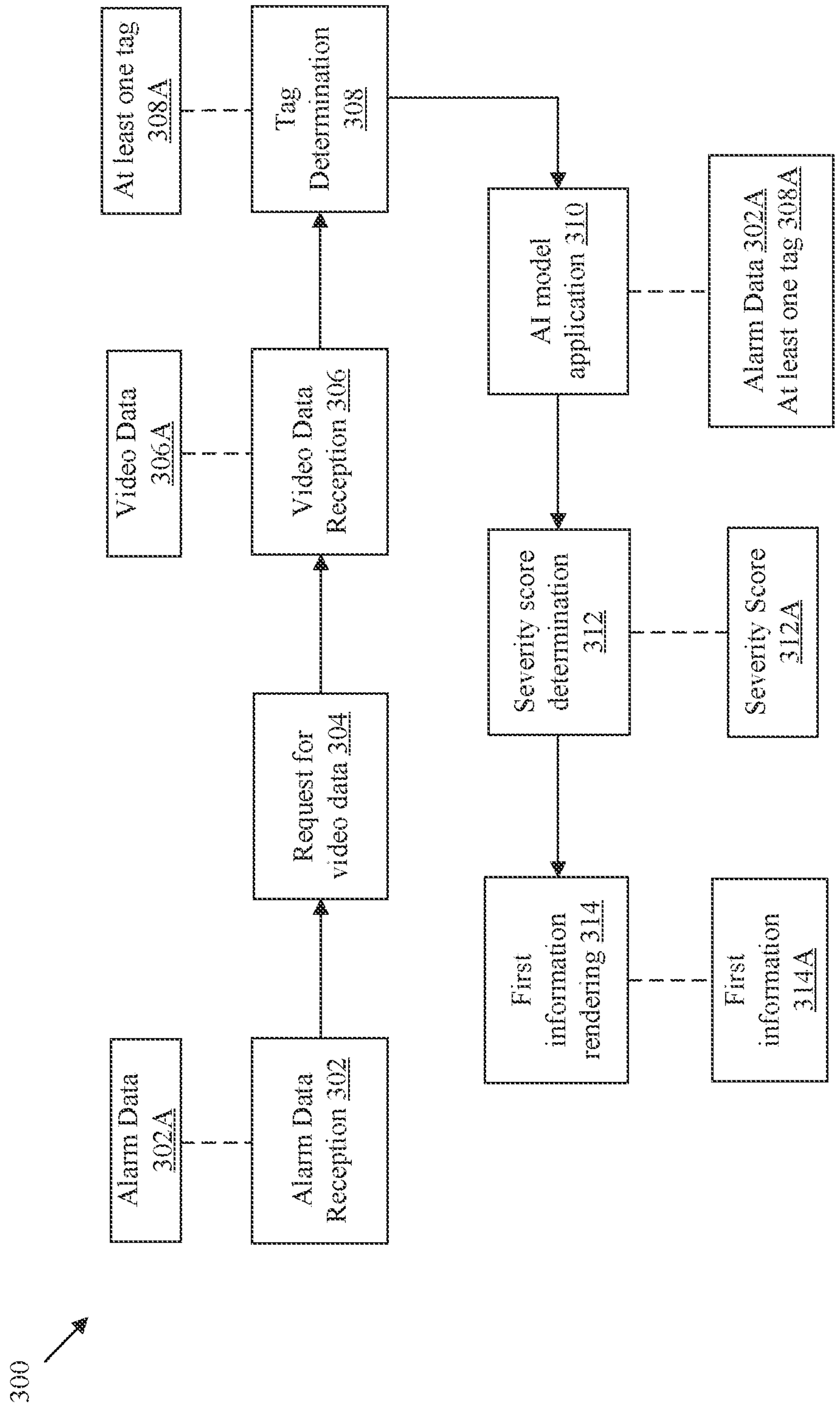
FIG. 3 is a diagram that illustrates an exemplary processing pipeline for artificial intelligence based resolution of security alarm events using video data, in accordance with an embodiment of the disclosure.

FIG. 3 is a diagram that illustrates an exemplary processing pipeline for artificial intelligence based resolution of security alarm events using video data, in accordance with an embodiment of the disclosure. FIG. 3 is explained in conjunction with elements from FIG. 1 and FIG. 2. With reference to FIG. 3, there is shown an exemplary processing pipeline 300 that illustrates exemplary operations from 302 to 314. The exemplary operations 302 to 314 may be executed by any computing system, for example, by the electronic device 102 of FIG. 1 or by the circuitry 202 of FIG. 2. In FIG. 3, there is further shown, alarm data 302A, video data 306A, at least one tag 308A, a severity score 312A, and first information 314A.

At 302, an operation of alarm data reception may be executed. The circuitry 202 may be configured to receive alarm data (e.g., the alarm data 302A) related to at least one alarm event associated with at least one of the first point of access 118A or the second point of access 118B. The alarm data 302A may include at least one of a time of occurrence of the at least one alarm event, a type of the at least one alarm event, or the location information associated with the at least one of the first point of access 118A or the second point of access 118B.

With reference to FIG. 1, the second person 124B may, for example, try to open the first point of access 118A (such as, a door or a gate) to enter the second physical area 120B. The first access credential reader 114A may acquire the first credential information associated with the second person 124B. For example, the first access credential reader 114A may be a card reader that may acquire the first credential information from an access badge of the second person 124B. The first access credential reader 114A may store the location information associated with the first point of access 118A. The access control system 104 may receive the first credential information associated with the second person 124B and the location information associated with the first point of access 118A from the first access credential reader 114A. The access control system 104 may receive the second credential information related to the list of authorized persons from the server 106 (or from the database 108, via the server 106). Thereafter, the access control system 104 may compare the first credential information associated with the second person 124B with the second credential information related to the list of authorized persons. The access control system 104 may determine whether the first credential information associated with the second person 124B matches with the second credential information related to the list of authorized persons, based on the comparison. For example, the access control system 104 may determine whether the identification information (such as, a name or an ID number) of the second person 124B matches with identification information (such as, a name or an ID number) of an authorized person stored in the server 106.

In one scenario, the access control system 104 may determine that the first credential information associated with the second person 124B is invalid based on a determination that the first credential information associated with the second person 124B does not match with the second credential information related to the list of authorized persons. The access control system 104 may detect an occurrence of the invalid badge event based on the determination that the first credential information associated with the second person 124B is invalid. The access control system 104 may generate and transmit, to the electronic device 102, the alarm data 302A that may include a time of occurrence of the invalid badge event, a type of the at least one alarm event (such as, the invalid badge event), and the location information associated with the first point of access 118A.

In another scenario, the access control system 104 may determine that the first credential information associated with the second person 124B is valid based on a determination that the first credential information associated with the second person 124B matches with the second credential information related to the list of authorized persons. The access control system 104 may receive the access level information related to the list of authorized persons from the server 106. The access level information may include, for example, one or more access levels assigned to each authorized person in the list of authorized persons. The one or more access levels assigned to each authorized person may indicate at least one physical area (such as, the first physical area 120A or the second physical area 120B) or at least one point of access (such as, the first point of access 118A or the second point of access 118B) that the authorized person is allowed to enter or open, respectively. The access control system 104 may determine whether the second person 124B having the valid first credential information is authorized to open the first point of access 118A, based on the access level information and the location information associated with the first point of access 118A. For example, the access control system 104 may determine whether the second person 124B has a proper access level to open the first point of access 118A, based on the one or more access levels assigned to the second person 124B and the location information associated with the first point of access 118B. The access control system 104 may detect an occurrence of the invalid access level event based on a determination that the second person 124B does not have the proper access level to open the first point of access 118A. The access control system 104 may generate and transmit, to the electronic device 102, the alarm data 302A that may include a time of occurrence of the invalid access level event, a type of the at least one alarm event (such as, the invalid access level event), and the location information associated with the first point of access 118A.

In another scenario, the access control system 104 may transmit a command to the first lock system 116A to open or unlock the first lock system 116A based on the determination that the first credential information associated with the second person 124B is valid. The first lock system 116A may manage the access to the first point of access 118A based on the command from the access control system 104. For example, the first lock system 116A may unlock the one or more locking devices based on the command from the access control system 104. The access control system 104 may receive a first signal from the first lock system 116A based on the unlock of the one or more locking devices of the first lock system 116A. The first signal may indicate, for example, that the first point of access 118A (such as, a door or a gate) is opened. The access control system 104 may determine whether a second signal is received from the first lock system 116A within a first time period from a time of opening of the first point of access 118A. The second signal may indicate, for example, that the first point of access 118A is closed. The access control system 104 may detect an occurrence of the DHO event associated with the first point of access 118A based on a determination the second signal is not received from the first lock system 116A within the first time period (for example, 5 seconds) from the time of opening of the first point of access 118A. The access control system 104 may generate and transmit, to the electronic device 102, the alarm data 302A that includes a time of occurrence of the DHO event, a type of the at least one alarm event (such as the DHO event), and the location information associated with the first point of access 118A.

With reference to FIG. 1, in another scenario, the second person 124B may, for example, try to force open the first point of access 118A (such as, a door or a gate) to enter the second physical area 120B. The access control system 104 may receive a first signal from the first lock system 116A that may indicate that the first point of access 118A is opened. The access control system 104 may determine whether the first credential information associated with the second person 124B is received from the first access credential reader 114A. In an example, the access control system 104 may detect an occurrence of the DFO event based the reception of the first signal that may indicate that the first point of access 118A is opened and a determination that the first credential information is not received from the first access credential reader 114A. In another example, the access control system 104 may detect the occurrence of the DFO event based the reception of the first signal that may indicate that the first point of access 118A is opened and the determination that the first credential information associated with the second person 124B is invalid. The access control system 104 may generate and transmit, to the electronic device 102, the alarm data 302A that includes a time of occurrence of the DFO event, a type of the at least one alarm event (such as, the DFO event), and the location information associated with the first point of access 118A.

In an example, the access control system 104 may detect an occurrence of a hardware fault event (such as, a line error active event, an open line alarm active event, a shorted line alarm active event, a grounded loop alarm active event, a power failure event, a reader offline event, a relay contact deactivated event, a communication with host lost event, or a communication lost event). The line error active event may indicate that a communication line or wiring between the access control system 104 and one or more peripheral devices (such as the first access credential reader 114A, the second access credential reader 114B, the first lock system 116A, or the second lock system 116B) is faulty. The open line alarm active event may indicate that the communication line or wiring between the access control system 104 and the one or more peripheral devices has an open circuit or is broken. The shorted line alarm active may indicate that the communication line or wiring between the access control system 104 and the one or more peripheral devices has a short circuit. The grounded loop alarm active event may indicate a ground loop problem in the communication line or wiring between the access control system 104 and the one or more peripheral devices. The power failure event may indicate that a power supply to the one or more peripheral devices is stopped or interrupted. The communication lost event may indicate that a communication between the access control system 104 and the one or more peripheral devices is lost. The reader offline event may indicate that at least one of the first access credential reader 114A or the second access credential reader 114B is in an offline mode or is turned off. The relay contact deactivated event indicates that a relay included in the access control system 104 is deactivated or turned off. The communication with host lost event may indicate that the access control system 104 has lost connection with the server 106. In another example, the access control system 104 may detect a granted access-pending entry event that may indicate that the access control system 104 has granted access to a physical area (such the first physical area 120A or the second physical area 120B) for a person (such as the first person 124A, the second person 124B, the third person 124C, or the fourth person 124D), however the person has not yet entered the physical area. The access control system 104 may generate and transmit, to the electronic device 102, the alarm data 302A that may include a type of the at least one alarm event such as the hardware fault event.

At 304, an operation of request for video data may be executed. The circuitry 202 may be configured to transmit a request for video data (e.g., the video data 306A) to the server 106 (or the database 108, via the server 106) or the at least one imaging device of the set of imaging devices 110A, 110B, 110C, and 110D, based on the received alarm data. The video data 306A may include a video footage of a physical area in which the alarm event occurred. The circuitry 202 may transmit the request for the video data 306A based on the type of the at least one alarm event. For example, the circuitry 202 may determine the type of the at least one alarm event is one of the DFO event, the DHO event, or the invalid badge event. The circuitry 202 may transmit the request for the video data 306A corresponding to a time of occurrence of one of the DFO event, the DHO event, or the invalid badge event. A person with ordinary skill in the art will understand that the request for the video data 306A may not be transmitted for each type of alarm event. For example, in a case where the type of the at least one alarm event is the invalid access level event, the circuitry 202 may not request the video data 306A. Details related to the request for the video data 306A are further provided, for example, in FIG. 5A, FIG. 6A, and FIG. 7.

At 306, an operation of video data reception may be executed. The circuitry 202 may be configured to receive the video data 306A in response to the transmitted request. The video data 306A may be received from the server 106 (or the database 108, via the server 106) or the at least one imaging device of the set of imaging devices 110A, 110B, 110C, and 110D. The video data 306A may include, for example, a physical area (such as the first physical area 120A or the second physical area 120B) that may be in a field of view of the at least one imaging device. The video data 306A may include, for example, at least one point of access (such as the first point of access 118A or the second point of access 118B) and at least one person (such as the first person 124A, the second person 124B, the third person 124C, or the fourth person 124D) in the vicinity of the at least one point of access. Details related to the reception of the video data 306A are further provided, for example, in FIG. 5A, FIG. 6A, and FIG. 7.

At 308, an operation of tag determination may be executed. The circuitry 202 may be configured to analyze the received video data 306A and determine at least one tag (for example, the at least one tag 308A) based on the analysis of the received video data 306A. For example, the circuitry 202 may apply the AI model 102A on the received video data 306A to detect the at least one person in the vicinity of the at least one point of access and determine an activity of the detected at least one person. The determined activity of the detected at least one person may include a movement of the detected at least one person in the vicinity of the at least one point of access. The circuitry 202 may determine the at least one tag 308A based on the movement of the detected at least one person in the vicinity of the at least one point of access. The determined at least one tag 308A may indicate one of an entry of the at least one person through the at least one point of access, an exit of the at least one person through the at least one point of access, a loitering of the at least one person on a secure side of the at least one point of access, or a loitering of the at least one person on an unsecure side of the at least one point of access. A person with ordinary skill in the art will understand that the determination of the at least one tag 308A may not only be based on the analysis of the received video data 306A. For example, the circuitry 202 may receive access grant information indicating an access granted event associated with the at least one point of access from the access control system 104. The access grant information may indicate that an access to a physical area has been granted to a person by the access control system 104. The circuitry 202 may determine whether a time of occurrence of the access granted event is within a second time period from a time of occurrence of the at least one alarm event. The circuitry 202 may determine, for example, that the at least one tag 308A may indicate the access granted event based on a determination that the time of occurrence of the access granted event is within the second time period from the time of occurrence of the at least one alarm event. In another example, the circuitry 202 may determine that the at least one tag 308A may indicate an unauthorized entry by the at least one person based on the entry of the at least one person through the at least one point of access and a determination that the time of occurrence of the access granted event is not within the second time period. Details related to the determination of the at least one tag 308A are further provided, for example, in FIGS. 5B and 6B.

At 310, an operation of AI model application may be executed. The circuitry 202 may be configured to apply an AI model (for example, the AI model 102A) on at least one of the determined at least one tag 308A or the received alarm data 302A. The determined at least one tag 308A and the received alarm data 302A may be fed to the AI model 102A for inference. The AI model 102A may be a pre-trained machine learning model (such as, a neural network model), for example, which may be trained based on a dataset of tags of various types, alarm data events of various types, and corresponding severity scores. In an example, the AI model 102A may correspond to a regression model that may be configured to predict a severity score based on a given tag and given alarm data. The AI model 102A may analyze at least one of the determined at least one tag 308A or the received alarm data 302A to determine a severity score 312A indicating a level of authenticity of the at least one alarm event.

At 312, an operation of severity score determination may be executed. The circuitry 202 may be configured to determine a severity score (e.g., the severity score 312A) based on the application of the AI model 102A. The circuitry 202 may determine different severity scores for different types of alarm events (such as, the DFO event, the DHO event, the invalid access level event, or the invalid badge event). Details related to the determination of the severity score 312A are further provided, for example, in FIG. 4, FIG. 5A, FIG. 5B, FIG. 6A, FIG. 6B, and FIG. 7. The circuitry 202 may determine whether the severity score 312A is less than or equal to a threshold score, or greater than the threshold score. The circuitry 202 may set the threshold score based a user input provided through the output device 112 or the electronic device 102. In a case where the severity score 312A is less than or equal to the threshold score, the level of authenticity of the at least one alarm event may indicate that the at least one alarm event may be a false alarm. In a case where the severity score 312A is greater than the threshold score, the level of authenticity of the at least one alarm event may indicate that the at least one alarm event may be a true alarm.

At 314, an operation of first information rendering may be executed. The circuitry 202 may be configured to control rendering of first information (e.g., the first information 314A) on a user interface of the output device 112 (and/or the electronic device 102) based on the determined severity score 312A. The first information 314A may include, but is not limited to, the determined severity score 312A, the type of the at least one alarm event, the time of occurrence of the at least one alarm event, and location information associated with the at least one point of access (such as, the first point of access 118A or the second point of access 118B). The first information 314A may also include, but is not limited to, second information indicating one of a resolution of the at least one alarm event or third information indicating the at least one alarm event is pending for review for the operator. The circuitry 202 may control rendering of the second information on the user interface in a case where the severity score 312A is less than or equal to the threshold score. The circuitry 202 may control rendering of the third information on the user interface in a case where the severity score 312A is greater than the threshold score. Details related to the rendering of the first information 314A are further provided, for example, in FIG. 5A, FIG. 5B, FIG. 6A, FIG. 6B, FIG. 7, and FIG. 9.

Despite various security measures, a risk that a security breach goes undetected may remain a common problem for most enterprises. Typically, physical security operators may be deployed in a building to monitor alarms from access control systems and manually check video feeds from cameras located near entry points or doors to ensure that no unauthorized individual enters the building. However, the physical security operators may experience alarm fatigue from a large number of false alarms that may be needed to be monitored from such access control systems because of faulty or poor configuration of components of the access control systems. As a result, the physical security operators may fail to recognize true alarms among the deluge of the false alarms, which can result in a security breach going undetected. In other words, due to the sheer number of security alarm events that may occur in a given day, the physical security operators may have to go through several video footages and may thereby be overwhelmed. A majority of such security alarm events may turn out to be false alarms that may be triggered due to various reasons such as, faults in the access control system, suspicious looking activity of benign employees, and the like. As the physical security operators may be overwhelmed, the physical security operators may overlook certain high risk events. For example, tailgating or loitering by outsiders in certain secure areas may get overlooked by the physical security operators burdened with monitoring hours of uneventful video footage. Thus, the organizations may be vulnerable to problems such as sensitive data breach, asset loss, and personnel harm.

In order to address the aforesaid issues, the disclosed electronic device 102 and method may determine at least one tag associated with an alarm event based on at least one of alarm data related to the alarm event or video data corresponding to the alarm data. The disclosed electronic device 102 may determine a severity score indicating a level of authenticity of the alarm event by application of an artificial intelligence (AI) model (e.g., the AI model 102A) based on the determined at least one tag and the alarm data. The disclosed electronic device 102 may control rendering of information indicating a resolution of the alarm event in a case where the determined severity score is less than a threshold score. Further, the disclosed electronic device 102 may control rendering of information indicating the alarm event is pending for review for an operator in a case where the determined severity score is greater than the threshold score. The present disclosure provides a cost-effective solution that enhances security of a physical area by automatic identification of false alarm events and true alarm events, and automatic resolution of the false alarm events. Thus, the present disclosure may reduce the risk of undetected true alarm events, and enhance the overall security of the enterprises by automatic reduction of the number of false alarms to be notified to the operator. Further, real-time information may be provided to the operator to indicate an occurrence of true or genuine alarm events. Also, an alarm fatigue of the physical security operators may be reduced and the physical security operators may just monitor the automatically detected true alarm events instead of going through several uneventful video footages. This may also improve an alertness of the physical security operators and help detect security lapses in a timely manner.

Figure 4:
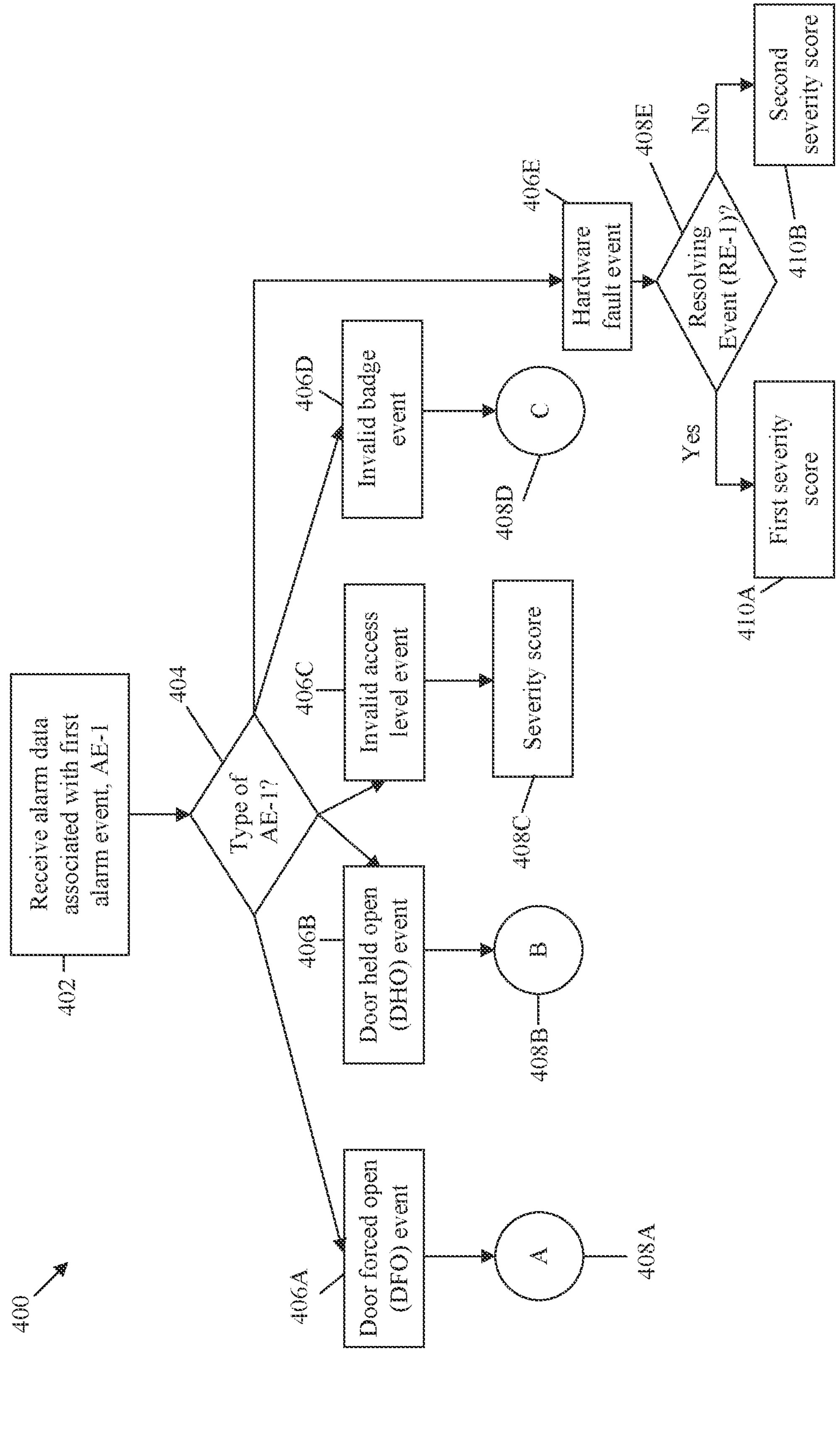
FIG. 4 is a flowchart that illustrates operations of an exemplary method for artificial intelligence based resolution of security alarm events, in accordance with an embodiment of the disclosure.

FIG. 4 is a flowchart that illustrates exemplary operations for artificial intelligence based resolution of security alarm events, in accordance with an embodiment of the disclosure. FIG. 4 is explained in conjunction with elements from FIG. 1, FIG. 2, and FIG. 3. With reference to FIG. 4, there is shown an exemplary flowchart 400 that includes operations from 402 to 410B (i.e., including, for example, operations 402, 404, 406A-406E, 408A-408E, and 410A-410B), as described herein. The operations from 402 to 410B may be implemented, for example, by the electronic device 102 of FIG. 1 or the circuitry 202 of FIG. 2. Control starts from 402.

At 402, alarm data related to a first alarm event (e.g., an alarm event-1, such as, "AE-1") may be received from the access control system 104. The circuitry 202 may be configured to receive the alarm data related to the first alarm event, such as, "AE-1". The alarm event "AE-1" may be associated with a point of access (such as, the first point of access 118A or the second point of access 118B). The alarm data may include, but is not limited to, at least one of a time of occurrence of the first alarm event "AE-1", a type of the first alarm event "AE-1", location information (an identification number or a name) associated with the point of access, or a time of opening of the point of access.

At 404, the type of the first alarm event "AE-1" may be determined based on the received alarm data. The circuitry 202 may be configured to determine the type of the first alarm event "AE-1" based on the received alarm data. The type of the first alarm event "AE-1" may include, for example, the DFO event, the DHO event, the invalid access level event, the invalid badge level event, or the hardware fault event. The determination of the type of the first alarm event is described further, for example, in FIGS. 1 and 3 (at 302).

At 406A, the type of the first alarm event "AE-1" may be determined as the DFO event. The circuitry 202 may be configured to determine that the type of the first alarm event "AE-1" may be the DFO event based on the received alarm data. Details related to detection of the DFO event are further provided for example, in FIG. 3 (at 302).

At 408A, operations related to resolution of the DFO event may be executed. The circuitry 202 may be configured to execute operations related to the resolution of the DFO event, in case the type of the first alarm event "AE-1" is determined as the DFO event. Details related to the resolution of the DFO event are further provided, for example, in FIGS. 5A and 5B.

At 406B, the type of the first alarm event "AE-1" may be determined as the DHO event. The circuitry 202 may be configured to determine that the type of the first alarm event "AE-1" may be the DHO event based on the received alarm data. Details related to detection of the DHO event are further provided for example, in FIG. 3 (at 302).

At 408B, operations related to resolution of the DHO event may be executed. The circuitry 202 may be configured to execute operations related to the resolution of the DHO event, in case the type of the first alarm event "AE-1" is determined as the DHO event. Details related to the resolution of the DHO event are further provided, for example, in FIGS. 6A and 6B.

At 406C, the type of the first alarm event "AE-1" may be determined as the invalid access level event. The circuitry 202 may be configured to determine that the type of the first alarm event "AE-1" may be the invalid access level event based on the received alarm data. Details related to detection of the invalid access level event are further provided for example, in FIG. 3 (at 302).

At 408C, a severity score for the invalid access level event may be determined. The circuitry 202 may be configured to determine the severity score for the invalid access level event. The severity score for the invalid access level event may be greater than the threshold score. For example, the severity score for the invalid access level event may be, a number greater than "50", such as, "70". The circuitry 202 may be configured to control, based on the severity score for the invalid access level event, rendering of the third information that may indicate the invalid access level event is pending for review for the operator.

At 406D, the type of the first alarm event "AE-1" may be determined as the invalid badge event. The circuitry 202 may be configured to determine that the type of the first alarm event "AE-1" may be the invalid badge event based on the received alarm data. Details related to detection of the invalid badge event are further provided for example, in FIG. 3 (at 302).

At 408D, operations related to resolution of the invalid badge event may be executed. The circuitry 202 may be configured to execute operations related to the resolution of the invalid badge event, in case the type of the first alarm event "ÄE-1" is determined as the invalid badge event. Details related to the resolution of the invalid badge event are further provided, for example, in FIG. 7.

At 406E, the type of the first alarm event "AE-1" may be determined as the hardware fault event. The circuitry 202 may be configured to determine that the type of the first alarm event "AE-1" may be the hardware fault event based on the received alarm data. The hardware fault event may include, but is not limited to, the line error active event, the open line alarm active event, the shorted line alarm active event, the grounded loop alarm active event, the power failure event, the reader offline event, the relay contact deactivated event, the communication with host lost event, or the communication lost event. Details related to detection of the hardware fault event are further provided for example, in FIG. 3 (at 302).

At 408E, one of an occurrence or a non-occurrence of a resolving event "RE-1" corresponding to the hardware fault event may be detected. The circuitry 202 may be configured to detect one of the occurrence or the non-occurrence of the resolving event "RE-1" within a third time period from a time of occurrence of the hardware fault event. The circuitry 202 may, for example, set the third time period based on a user input provided through the output device 112 (or the electronic device 102). The third time period may be, for example, 5 minutes. The resolving event "RE-1" may indicate one of a resolution or a cancelation of the hardware fault event. The circuitry 202 may be configured to receive resolving event information indicating the occurrence (or non-occurrence) of the resolving event "RE-1" from the access control system 104. The circuitry 202 may be configured to determine the occurrence of the resolving event "RE-1" within the third time period from the time of occurrence of the first alarm event "AE-1", based on the received resolving event information. Examples of the resolving event "RE-1" may include, but are not limited to, a canceled line error event, a canceled open line event, a canceled shorted line event, a canceled grounded loop event, a canceled power failure event, a communication restored event, a communication with host restored event, a reader offline restored event, or a relay contact activated event. In an embodiment, the resolving event "RE-1" may be a complementary event to the first alarm event "AE-1" (which may be the hardware fault event) such that the occurrence of the resolving event "RE-1" may result in a cancellation or resolution of the first alarm event "AE-1" (for example, the hardware fault event).

At 410A, a first severity score for the hardware fault event may be determined. The circuitry 202 may be configured to determine the first severity score based on the determination of the occurrence of the resolving event "RE-1" within the third time period from the time of occurrence of the hardware fault event. The first severity score may be less than or equal to the threshold score. For example, the first severity score may be "10" and the threshold score may be "50". The circuitry 202 may be configured to control, based on the first severity score, rendering of the second information that may indicate the hardware fault event is resolved. Therefore, in case the resolving event "RE-1" occurs within the third time period from the occurrence of the hardware fault event, the first severity score (which may be less than the threshold score) may be determined for the hardware fault event and the hardware fault event may be auto-resolved.

At 410A, a second severity score for the hardware fault event may be determined. The circuitry 202 may be configured to determine the second severity score based on the determination of the non-occurrence of the resolving event "RE-1" within the third time period from the time of occurrence of the hardware fault event. The second severity score may be greater than the threshold score. For example, the second severity score may be, for example, "60". The circuitry 202 may be configured to control, based on the second severity score, rendering of the third information that may indicate the hardware fault event is pending for review for the operator. Additionally, the circuitry 202 may control rendering of information that may include, but is not limited to, the time of occurrence of the hardware fault event or the type of the first alarm event AE-1. Thus, in case the resolving event "RE-1" occurs after the end of the third time period (from the occurrence of the first alarm event "AE-1") or does not occur at all, the hardware fault event may be assigned a higher severity score (such as, the second severity score, which may have a value of "60"). In such a case, the hardware fault event may not be auto-resolved and may be sent for manual resolution to the output device 112.

Figure 5A:
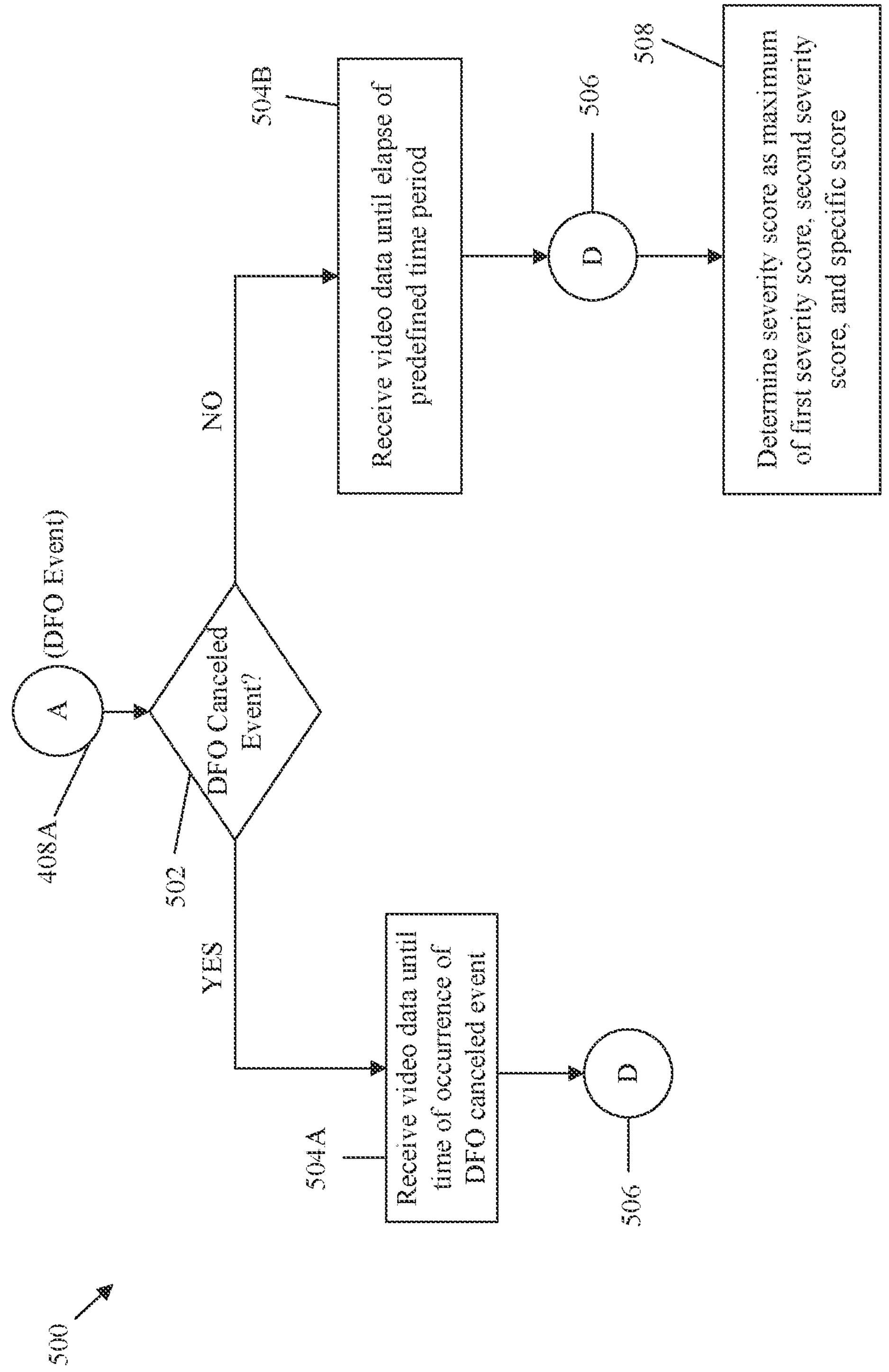
FIGS. 5A and 5B are flowcharts that collectively illustrate operations of an exemplary method for artificial intelligence based resolution of a door forced open (DFO) event, in accordance with an embodiment of the disclosure.
Figure 5B:
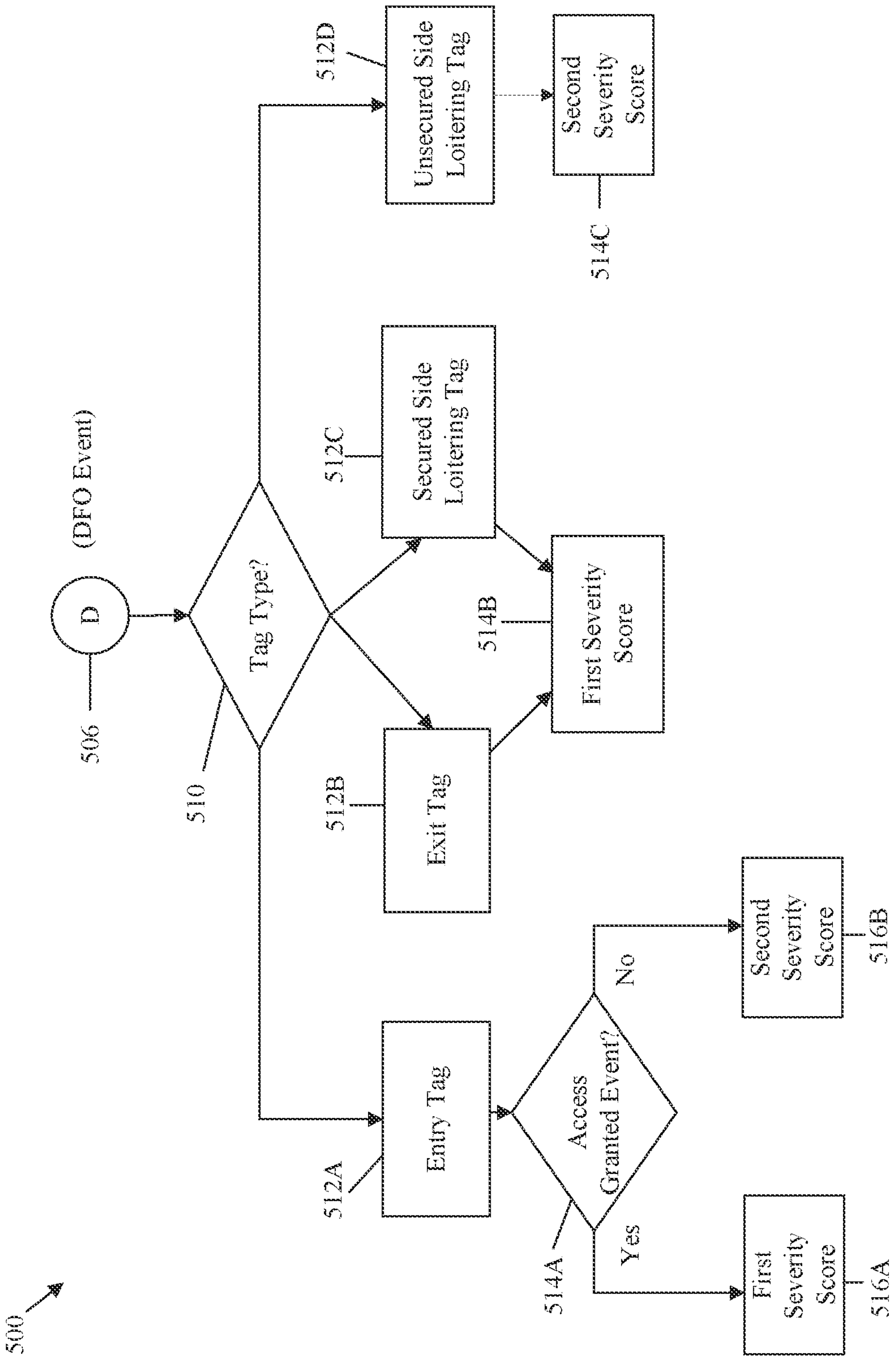

FIGS. 5A and 5B are flowcharts that collectively illustrate operations of an exemplary method for artificial intelligence based resolution of a door forced open (DFO) event, in accordance with an embodiment of the disclosure. FIGS. 5A and 5B are explained in conjunction with elements from FIG. 1, FIG. 2, FIG. 3, and FIG. 4. With reference to FIGS. 5A and 5B, there is shown an exemplary flowchart 500 that includes operations from 408A to 516B (i.e., including, for example, operations 408A, 502, 504A-504B, 506, 508, 510, 512A-512D, 514A-514C, and 516A-516B), as described herein. The operations from 408A to 516B may be implemented, for example, by the electronic device 102 of FIG. 1 or the circuitry 202 of FIG. 2.

With reference to FIG. 5A, starts from 408A and passes to 502. At 502, one of an occurrence or a non-occurrence of a DFO canceled event within a fourth time period from a time of occurrence of the DFO event may be detected. The circuitry 202 may be configured to detect one of the occurrence or the non-occurrence of the DFO canceled event within the fourth time period from the time of occurrence of the DFO event. The fourth time period may be a predefined time period set by the circuitry 202 based on a user input provided through the output device 112 (or the electronic device 102). The fourth time period may be, for example, 5 minutes. The circuitry 202 may be configured to receive resolving event information that may indicate the DFO canceled event, from the access control system 104. The circuitry 202 may be configured to detect the occurrence of the DFO canceled event within the fourth time period from the time of occurrence of the DFO event based on the received resolving event information.

At 504A, video data until a time of occurrence of the DFO canceled event may be received based on the detection of the occurrence of the DFO canceled event within the fourth time period from the time of occurrence of the DFO event. The circuitry 202 may be configured to transmit a request to the server 106 (or the database 108, via the server 106) or at least one imaging device of the set of imaging devices 110A, 110B, 110C, and 110D to receive the video data until the time of occurrence of the DFO canceled event. The circuitry 202 may be configured to receive the video data until the time of occurrence of the DFO canceled event based on the detection of the occurrence of the DFO canceled event within the fourth time period from the time of occurrence of the DFO event. The video data may correspond to the time of occurrence of the DFO event. It may be understood by a person skilled in the art that for the DFO event, the video footage between the time of occurrence of the DFO event and the time of occurrence of the DFO canceled event may be relevant to process the corresponding alarm data. Video footage before the DFO event or after the DFO canceled event may not be relevant for analysis of the alarm data associated with the DFO event.

At 504B, video data until an elapse of a predefined time period (e.g., the fourth time period) may be received based on the detection of the non-occurrence of the DFO canceled event within the fourth time period from the time of occurrence of the DFO event. The circuitry 202 may be configured to transmit a request to the server 106 (or the database 108, via the server 106) or at least one imaging device of the set of imaging devices 110A, 110B, 110C, and 110D to receive the video data until the elapse of a predefined time period (e.g., the fourth time period). The circuitry 202 may be configured to receive the video data until the elapse of the fourth time period based on the detection of the non-occurrence of the DFO canceled event within the fourth time period from the time of occurrence of the DFO event. The video data may correspond to the time of occurrence of the DFO event. As the DFO canceled event is not received, video footage associated with the DFO event may be required from the time of occurrence of the DFO event up to a certain predefined or specific time period after the DFO event. The duration of the video footage that may be requested may be such that it may be sufficient for analysis of the DFO event and its retrieval may also be less bandwidth intensive.

At 506, operations related to resolution of the DFO event may be executed. The circuitry 202 may be configured to execute the operations related to the resolution of the DFO event. Details related to the resolution of the DFO event are further provided, for example, in FIG. 5B.

With reference to FIG. 5B, control starts at 506 and passes to 510. At 510, at least one tag may be determined based on the received video data. The circuitry 202 may be configured to analyze the received video data to determine at least one tag. For example, the circuitry 202 may apply the AI model 102A on the received video data to detect at least one person (such as, the first person 124A, the second person 124B, the third person 124C, or the fourth person 124D) in the vicinity of a point of access (such as, the first point of access 118A or the second point of access 118B). The circuitry 202 may determine an activity (such as, a movement) of the at least one person in the vicinity of the point of access, based on the application of the AI model 102A. The circuitry 202 may determine the at least one tag based on the determined activity of the at least one person. The determined at least one tag may indicate one of an entry of the at least one person through the point of access, an exit of the at least one person through the point of access, a loitering of the at least one person on a secure side of the point of access, or a loitering of the at least one person on an unsecure side of the point of access. Details related to the determination of the at least one tag are further provided, for example, in FIG. 8.

At 512A, the at least one tag that may indicate the entry of the at least one person through the point of access may be determined. The circuitry 202 may determine the at least one tag that may indicate the entry of the at least one person through the point of access, based on the analysis of the video data. With reference to FIG. 1, for example, the second person 124B may enter into the second physical area 120B through the first point of access 118A. The circuitry 202 may receive the video data captured by, for example, the imaging device 110A and the imaging device 110B. The circuitry 202 may analyze the video data to detect a movement of the second person 124B. The movement of the second person 124B may be from the unsecure side (i.e., the first physical area 120A) of the first point of access 118A to the secure side (the second physical area 120B) of the first point of access 118A. The circuitry 202 may determine the at least one tag that may indicate the entry of the second person 124B in the second physical area 120B, based on the detected movement of the second person 124B from the unsecure side of the first point of access 118A to the secure side of the first point of access 118A.

At 514A, one of an occurrence or a non-occurrence of an access granted event associated with the point of access (such as, the first point of access 118A or the second point of access 118B) may be detected. The circuitry 202 may detect one of the occurrence or the non-occurrence of the access granted event based on a difference between a time of occurrence of the access granted event associated with the point of access and the time of occurrence of the DFO event. For example, the circuitry 202 may detect the occurrence of the access granted event associated with the point of access in a case where the difference between the time of occurrence of the access granted event and the time of occurrence of the DFO event is less than or equal to the second time period (for example, 5 seconds). The circuitry 202 may detect the non-occurrence of the access granted event associated with the point of access in a case where the difference is greater than the second time period (or where the access granted event is not detected at all).

At 516A, a first severity score indicating a level of authenticity of the DFO event may be determined in case the detection of the occurrence of the access granted event (at 514A). The circuitry 202 may determine the first severity score for the DFO event based on the detection of the occurrence of the access granted event associated with the point of access and the at least one tag that may indicate the entry of the at least one person through the point of access. The first severity score may be less than or equal to the threshold score. For example, the first severity score may be "25". The circuitry 202 may control rendering of the second information on the user interface based on the first severity score. The second information may indicate a resolution of the DFO event.

At 516B, a second severity score indicating a level of authenticity of the DFO event may be determined in case the detection of the non-occurrence of the access granted event (at 514A). The circuitry 202 may determine the second severity score for the DFO event based on the detection of the non-occurrence of the access granted event associated with the point of access and the at least one tag that may indicate the entry of the at least one person through the point of access. The second severity score may be greater than the threshold score. For example, the second severity score may be "95". The circuitry 202 may control rendering of the third information on the user interface based on the second severity score. The third information may indicate that the DFO event is not resolved and is pending for review for the operator.

At 512B, the at least one tag that may indicate the exit of the at least one person through the point of access may be determined. The circuitry 202 may determine the at least one tag that may indicate the exit of the at least one person through the point of access, based on the analysis of the video data. With reference to FIG. 1, for example, the fourth person 124D may exit from the second physical area 120B through the second point of access 118B. The circuitry 202 may receive the video data captured by, for example, the imaging device 110C and the imaging device 110D. The circuitry 202 may analyze the video data to detect a movement of the fourth person 124D. The movement of the fourth person 124D may be from the secure side (i.e., the second physical area 120B) of the second point of access 118B to the unsecure side (e.g., another physical area, which may correspond to an unsecure area) of the second point of access 118B. The circuitry 202 may determine the at least one tag that may indicate the exit of the fourth person 124D from the second physical area 120B, based on the detected movement of the fourth person 124D from the secure side of the second point of access 118B to the unsecure side of the second point of access 118B. In another example, the circuitry 202 may determine that the at least one tag corresponds to a DFO event associated with a physical area of a premise, in case, a person exits the physical area and a REX (request-to-exit) motion sensor associated with a lock system associated with the premise is faulty. Such DFO event (caused due to a faulty REX motion sensor) may be a false alarm.

At 512C, the at least one tag that may indicate the loitering of the at least one person on the secure side of the point of access may be determined. The circuitry 202 may determine the at least one tag that may indicate the loitering of the at least one person on the secure side of the point of access, based on the analysis of the video data. With reference to FIG. 1, for example, the third person 124C may loiter on the secure side (i.e., the second physical area 120B) of the first point of access 118A. The circuitry 202 may receive the video data captured by, for example, the imaging device 110C and the imaging device 110D. The circuitry 202 may analyze the video data to detect an activity of the third person 124C on the secure side of the first point of access 118A. The activity of the third person 124C may indicate that the third person 124C may be standing (or in certain cases moving) on the secure side of the first point of access 118A. The circuitry 202 may determine the at least one tag that may indicate the loitering of the third person 124C on the secure side of the first point of access 118A, based on the detected activity of the third person 124C.

At 514B, a first severity score indicating a level of authenticity of the DFO event may be determined based on determination of the at least one tag as one of the exit tag (at 512B) or the secure side loitering tag (at 512C). The circuitry 202 may determine the first severity score for the DFO event based on the at least one tag that may indicate one of the exit of the at least one person through the point of access or the loitering of the at least one person on the secure side of the point of access. The first severity score may be less than or equal to the threshold score. For example, the first severity score may be "15" in a case where the at least one tag may indicate the exit of the at least one person through the point of access. The first severity score may be "40" in a case where the at least one tag may indicate the loitering of the at least one person on the secure side of the point of access. The circuitry 202 may control rendering of the second information on the user interface based on the first severity score. The second information may indicate a resolution of the DFO event.

At 512D, the at least one tag that may indicate the loitering of the at least one person on the unsecure side of the point of access may be determined. The circuitry 202 may determine the at least one tag that may indicate the loitering of the at least one person on the unsecure side of the point of access, based on the analysis of the video data. With reference to FIG. 1, for example, the first person 124A may loiter on the unsecure side of the first point of access 118A. The circuitry 202 may receive the video data captured by, for example, the imaging device 110A and the imaging device 110B. The circuitry 202 may analyze the video data to detect an activity of the first person 124A on the unsecure side of the first point of access 118A. The activity of the first person 124A may indicate that the first person 124A may be standing (or in certain cases moving) on the unsecure side of the first point of access 118A. The circuitry 202 may determine the at least one tag that may indicate the loitering of the first person 124A on the unsecure side of the first point of access 118A, based on the detected activity of the first person 124A.

At 514C, a second severity score indicating a level of authenticity of the DFO event may be determined based on the determination of the unsecured side loitering tag (at 512D). The circuitry 202 may determine the second severity score for the DFO event based on the at least one tag that may indicate the loitering of the at least one person on the unsecure side of the point of access. The second severity score may be greater than the threshold score. For example, the second severity score may be "90". The circuitry 202 may control rendering of the third information on the user interface based on the second severity score. The third information may indicate that the DFO event is not resolved and is pending for review for the operator. A person ordinary skill in the art will understand that the first severity scores determined based on different tags may be same or different from each other and the second severity scores determined based on different tags may be same or different from each other.

Referring back to FIG. 5A, at 508, a severity score may be determined as a maximum of the first severity score, the second severity score, and a specific score. The circuitry 202 may be configured to determine a severity score for the DFO event as the maximum of the first severity score, the second severity score, and the specific score, based on the detection (at 502) of the non-occurrence of the DFO canceled event within the fourth time period from the time of occurrence of the DFO event. The specific score may be greater than the threshold score. The specific score may be, for example, "70". The specific score may be a predefined score set by the circuitry 202 based on a user input received through the output device 112 (or the electronic device 102). In an example, the circuitry 202 may determine the severity score as "70" for the DFO event, in a case where the first severity score may be "25", the second severity score may be "60", and the specific score may be "70". In another example, the circuitry 202 may determine the severity score as "95" for the DFO event, in a case where the first severity score may be "25", the second severity score may be "95", and the specific score may be "70". The circuitry 202 may control rendering of the third information on the user interface based on the detection of the non-occurrence of the DFO canceled event within the fourth time period and the determined severity score that is the maximum of the first severity score, the second severity score, and the specific score. The third information may indicate that the DFO event is not resolved and is pending for review for the operator.

In an example, the circuitry 202 may determine that the requested video data corresponding to the time of occurrence of the DFO event may be unavailable or may be not returned from the server 106 (or the database 108, via the server 106) or at least one imaging device of the set of imaging devices 110A, 110B, 110C, and 110D. The circuitry 202 may determine the first severity score (for example, "25") for the DFO event, based on the determination that the requested video data may be unavailable or may be not returned and the detection of the occurrence of the access granted event associated with the point of access. The circuitry 202 may determine the second severity score (for example, "70") for the DFO event, based on the determination that the requested video data may be unavailable or may be not returned and the detection of the non-occurrence of the access granted event associated with the point of access.

In an example, in case the circuitry 202 determines that an imaging device (such as, the imaging device 110A) is on an unsecured side (e.g., the first physical area 120A) of a point of access (e.g., the first point of access 118A) and that no motion is detected on the unsecured side, the circuitry 202 may determine the first severity score (for example, "20") for a corresponding DFO alarm event. In such a case, the corresponding alarm event may be resolved. However, in another scenario, the circuitry 202 may determine the second severity score (for example, "70") for a DFO alarm event, in case motion is detected on either the unsecured side (e.g., the first physical area 120A) or the secured side (e.g., the second physical area 120B) of the point of access (e.g., the first point of access 118A). In such a case, the corresponding DFO alarm event may not be resolved and may be flagged as pending for review of an operator.

Figure 6A:
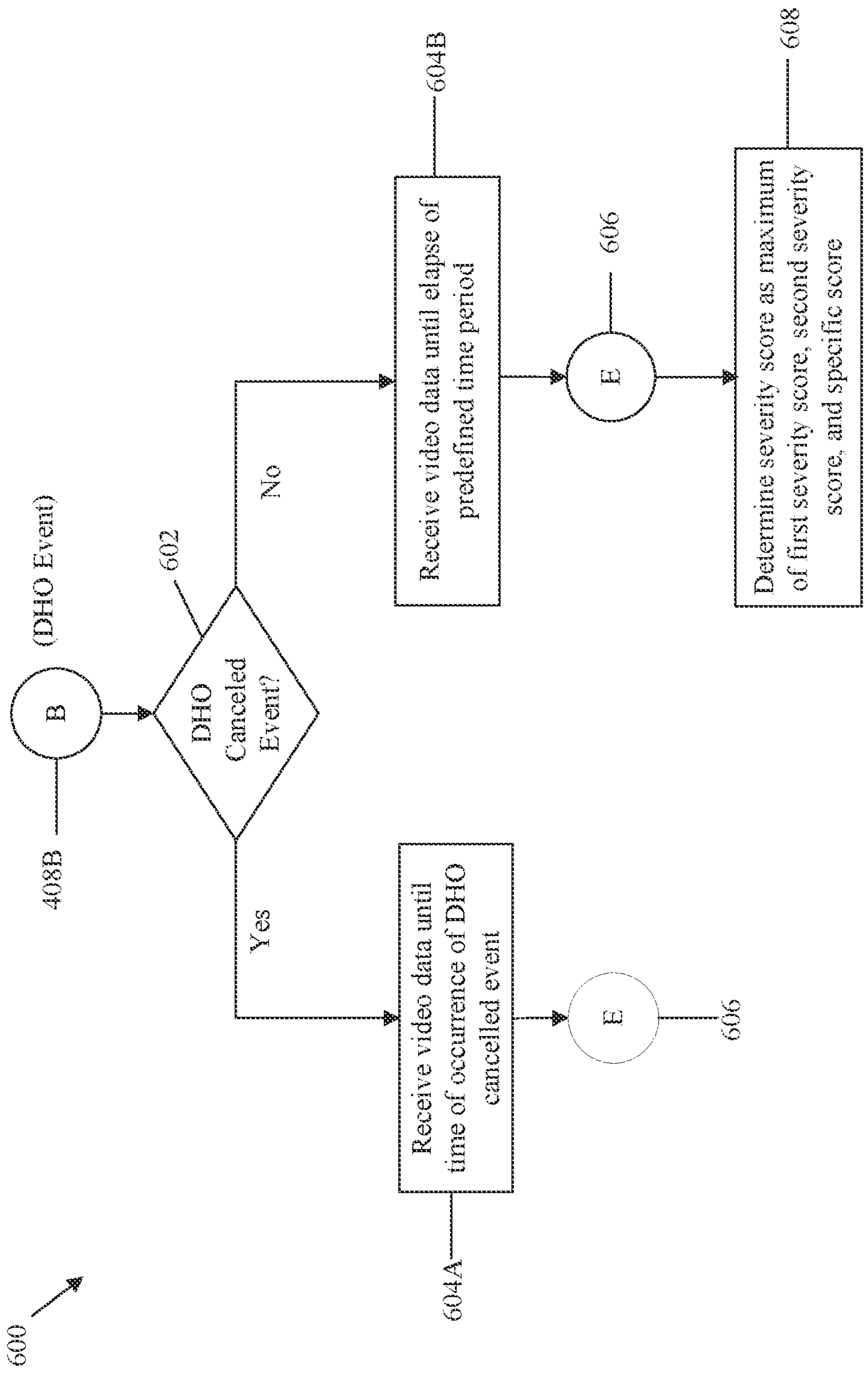
FIGS. 6A and 6B are flowcharts that collectively illustrate operations of an exemplary method for artificial intelligence based resolution of a door held open (DHO) event, in accordance with an embodiment of the disclosure.
Figure 6B:
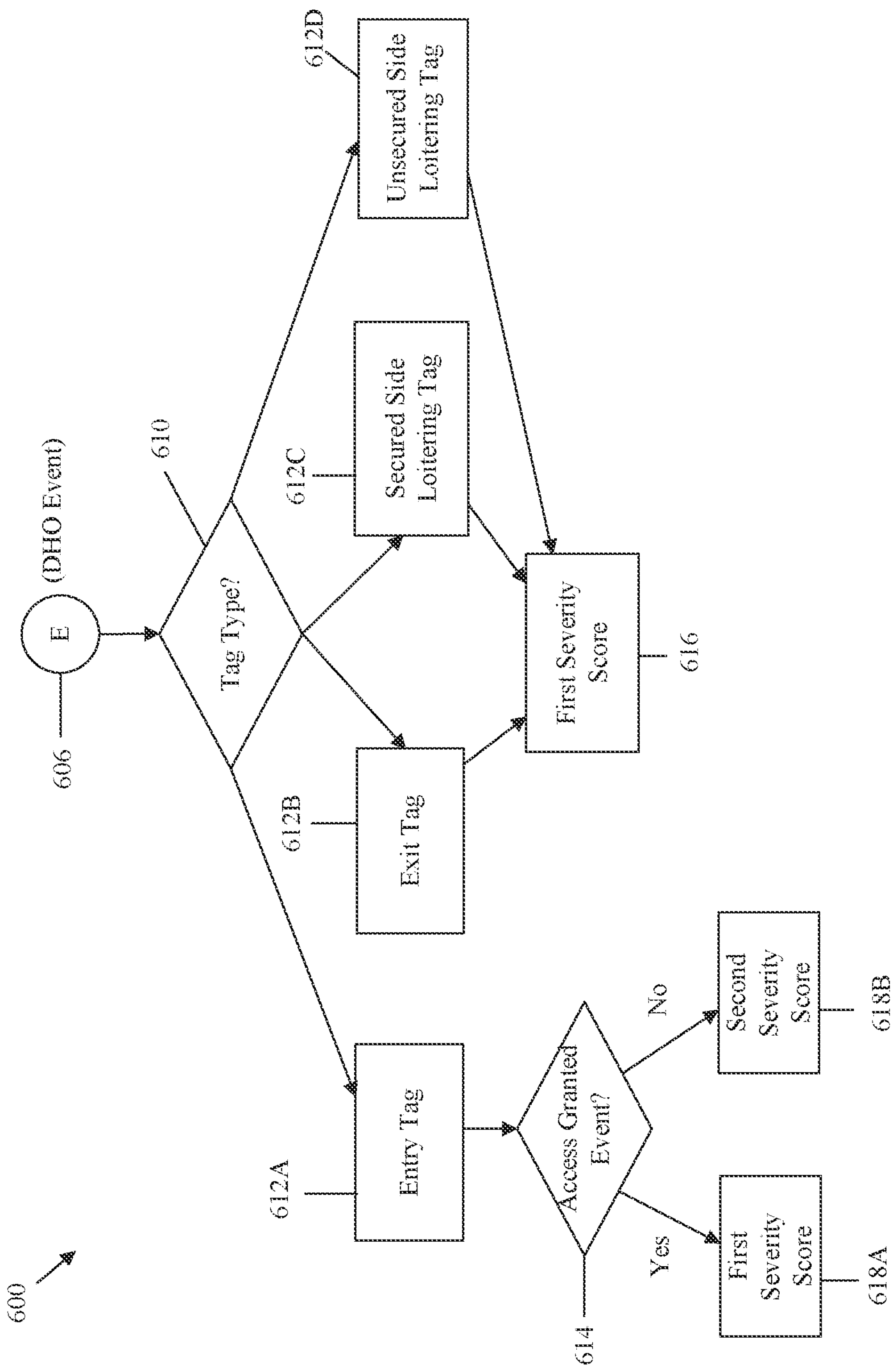

FIGS. 6A and 6B are flowcharts that collectively illustrate operations of an exemplary method for artificial intelligence based resolution of a door held open (DHO) event, in accordance with an embodiment of the disclosure. FIGS. 6A and 6B are explained in conjunction with elements from FIG. 1, FIG. 2, FIG. 3, FIG. 4, FIG. 5A, and FIG. 5B. With reference to FIGS. 6A and 6B, there is shown an exemplary flowchart 600 that includes operations from 408B to 618B (i.e., including, for example, operations 408B, 602, 604A-604B, 606, 608, 610, 612A-612D, 614, 616, and 618A-618B), as described herein. The operations from 408B to 618B may be implemented, for example, by the electronic device 102 of FIG. 1 or the circuitry 202 of FIG. 2.

With reference to FIG. 6A, control starts at 408B and passes to 602. At 602, one of an occurrence or a non-occurrence of a DHO canceled event within a fifth time period from a time of occurrence of the DHO event may be detected. The circuitry 202 may be configured to detect one of the occurrence or the non-occurrence of the DHO canceled event within the fifth time period from the time of occurrence of the DHO event. The fifth time period may be a predefined time period set by the circuitry 202 based on a user input provided through the output device 112 (or the electronic device 102). The fifth time period may be, for example, 5 minutes. The circuitry 202 may be configured to receive resolving event information that may indicate the DHO canceled event, from the access control system 104. The circuitry 202 may be configured to detect the occurrence of the DHO canceled event within the fifth time period from the time of occurrence of the DHO event based on the received resolving event information.

At 604A, video data until a time of occurrence of the DHO canceled event may be received based on the detection of the occurrence of the DHO canceled event within the fifth time period from the time of occurrence of the DHO event. The circuitry 202 may be configured to transmit a request to the server 106 (or the database 108, via the server 106) or at least one imaging device of the set of imaging devices 110A, 110B, 110C, and 110D to receive the video data until the time of occurrence of the DHO canceled event. The circuitry 202 may be configured to receive the video data until the time of occurrence of the DHO canceled event based on the detection of the occurrence of the DHO canceled event within the fifth time period from the time of occurrence of the DHO event. The video data may correspond to the time of occurrence of the DHO event. It may be understood by a person skilled in the art that for the DHO event, the video footage between the time of occurrence of the DHO event and the time of occurrence of the DHO canceled event may be relevant to process the corresponding alarm data. Video footage before the DHO event or after the DHO canceled event may not be relevant for analysis of the alarm data associated with the DHO event.

At 604B, video data until an elapse of a predefined time period (e.g., the fifth time period) may be received based on the detection of the non-occurrence of the DHO canceled event within the fifth time period from the time of occurrence of the DHO event. The circuitry 202 may be configured to transmit a request to the server 106 (or the database 108, via the server 106) or at least one imaging device of the set of imaging devices 110A, 110B, 110C, and 110D to receive the video data until the elapse of the fifth time period. The circuitry 202 may be configured to receive the video data until the elapse of the fifth time period based on the detection of the non-occurrence of the DHO canceled event within the fifth time period from the time of occurrence of the DHO event. The video data may correspond to the time of occurrence of the DHO event. As the DHO canceled event is not received, video footage associated with the DHO event may be required from the time of occurrence of the DHO event up to a certain predefined or specific time period after the DHO event. The duration of the video footage that may be requested may be such that it may be sufficient for analysis of the DHO event and its retrieval may also be less bandwidth intensive.

At 606, operations related to resolution of the DHO event may be executed. The circuitry 202 may be configured to execute operations related to the resolution of the DHO event. Details related to the resolution of the DHO event are further provided, for example, in FIG. 6B.

With reference to FIG. 6B, control starts at 606 and passes to 610. At 610, at least one tag may be determined based on the received video data. The circuitry 202 may be configured to analyze the received video data to determine at least one tag. For example, the circuitry 202 may apply the AI model 102A on the received video data to detect at least one person (such as, the first person 124A, the second person 124B, the third person 124C, or the fourth person 124D) in the vicinity of a point of access (such as, the first point of access 118A or the second point of access 118B). The circuitry 202 may determine an activity (such as, a movement) of the at least one person in the vicinity of the point of access, based on the application of the AI model 102A. The circuitry 202 may determine the at least one tag based on the determined activity of the at least one person. The determined at least one tag may indicate one of an entry of the at least one person through the point of access, an exit of the at least one person through the point of access, a loitering of the at least one person on a secure side of the point of access, or a loitering of the at least one person on an unsecure side of the point of access. Details related to the determination of the at least one tag are further provided, for example, in FIG. 8.

At 612A, the at least one tag that may indicate the entry of the at least one person through the point of access may be determined. The circuitry 202 may determine the at least one tag that may indicate the entry of the at least one person through the point of access, based on the analysis of the video data. With reference to FIG. 1, for example, the second person 124B may enter into the second physical area 120B through the first point of access 118A. The circuitry 202 may receive the video data captured by, for example, the imaging device 110A and the imaging device 110B. The circuitry 202 may analyze the video data to detect a movement of the second person 124B. The movement of the second person 124B may be from the unsecure side of the first point of access 118A to the secure side of the first point of access 118A. The circuitry 202 may determine the at least one tag that may indicate the entry of the second person 124B in the second physical area 120B, based on the detected movement of the second person 124B from the unsecure side of the first point of access 118A to the secure side of the first point of access 118A.

At 614, one of an occurrence or a non-occurrence of an access granted event associated with the point of access (such as, the first point of access 118A or the second point of access 118B) may be detected. The circuitry 202 may detect one of the occurrence or the non-occurrence of the access granted event associated with the point of access within a specific time period. The specific time period may be a time period during which the point of access may remain open. In an example, the specific time period may correspond to a time period between a time of opening of the point of access and a time of closing of the point of access. The time of closing of the point of access may correspond to the time of occurrence of the DHO canceled event. In another example, the specific time period may correspond to the fifth time period.

At 618A, a first severity score indicating a level of authenticity of the DHO event may be determined in case of the detection of the occurrence of the access granted event (at 614). The circuitry 202 may determine the first severity score for the DHO event based on the detection of the occurrence of the access granted event within the specific time period and the at least one tag that may indicate the entry of the at least one person through the point of access. The first severity score may be less than or equal to the threshold score. For example, the first severity score may be "5". The circuitry 202 may control rendering of the second information on the user interface based on the first severity score. The second information may indicate a resolution of the DHO event.

At 618B, a second severity score indicating a level of authenticity of the DHO event may be determined in case of the detection of the non-occurrence of the access granted event (at 614). The circuitry 202 may determine the second severity score for the DHO event based on the detection of the non-occurrence of the access granted event within the specific time period and the at least one tag that may indicate the entry of the at least one person through the point of access. The second severity score may be greater than the threshold score. For example, the second severity score may be "90". The circuitry 202 may control rendering of the third information on the user interface based on the second severity score. The third information may indicate that the DHO event is not resolved and is pending for review for the operator.

At 612B, the at least one tag that may indicate the exit of the at least one person through the point of access may be determined. The circuitry 202 may determine the at least one tag that may indicate the exit of the at least one person through the point of access, based on the analysis of the video data. With reference to FIG. 1, for example, the fourth person 124D may exit from the second physical area 120B through the second point of access 118B. The circuitry 202 may receive the video data captured by, for example, the imaging device 110C and the imaging device 110D. The circuitry 202 may analyze the video data to detect a movement of the fourth person 124D. The movement of the fourth person 124D may be from the secure side (i.e., the second physical area 120B) of the second point of access 118B to the unsecure side (e.g., another unsecure physical area outside the second physical area 120B) of the second point of access 118B. The circuitry 202 may determine the at least one tag that may indicate the exit of the fourth person 124D from the second physical area 120B, based on the detected movement of the fourth person 124D from the secure side of the second point of access 118B to the unsecure side of the second point of access 118B.

At 612C, the at least one tag that may indicate the loitering of the at least one person on the secure side of the point of access may be determined. The circuitry 202 may determine the at least one tag that may indicate the loitering of the at least one person on the secure side of the point of access, based on the analysis of the video data. With reference to FIG. 1, for example, the third person 124C may loiter on the secure side of the first point of access 118A. The circuitry 202 may receive the video data captured by, for example, the imaging device 110C and the imaging device 110D. The circuitry 202 may analyze the video data to detect an activity of the third person 124C on the secure side of the first point of access 118A. The activity of the third person 124C may indicate that the third person 124C may be standing (or in certain cases moving) on the secure side of the first point of access 118A. The circuitry 202 may determine the at least one tag that may indicate the loitering of the third person 124C on the secure side of the first point of access 118A, based on the detected activity of the third person 124C.

At 612D, the at least one tag that may indicate the loitering of the at least one person on the unsecure side of the point of access may be determined. The circuitry 202 may determine the at least one tag that may indicate the loitering of the at least one person on the unsecure side of the point of access, based on the analysis of the video data. With reference to FIG. 1, for example, the first person 124A may loiter on the unsecure side of the first point of access 118A. The circuitry 202 may receive the video data captured by, for example, the imaging device 110A and the imaging device 110B. The circuitry 202 may analyze the video data to detect an activity of the first person 124A on the unsecure side of the first point of access 118A. The activity of the first person 124A may indicate that the first person 124A may be standing (or in certain cases moving) on the unsecure side of the first point of access 118A. The circuitry 202 may determine the at least one tag that may indicate the loitering of the first person 124A on the unsecure side of the first point of access 118A, based on the detected activity of the first person 124A.

At 616, a first severity score indicating a level of authenticity of the DHO event may be determined based on the determination of one of the exit tag, the secured side loitering tag, or the unsecured side loitering tag. The circuitry 202 may determine the first severity score for the DHO event based on the at least one tag that may indicate one of the exit of the at least one person through the point of access, the loitering of the at least one person on the secure side of the point of access, or the loitering of the at least one person on the unsecure side of the point of access. The first severity score may be less than or equal to the threshold score. For example, the first severity score may be "5" in a case where the at least one tag may indicate the exit of the at least one person through the point of access. The first severity score may be "10" in a case where the at least one tag may indicate the loitering of the at least one person on the secure side of the point of access. The first severity score may be "15" in a case where the at least one tag may indicate the loitering of the at least one person on the unsecure side of the point of access. In another scenario, in case, the circuitry 202 determines that there is no motion on the unsecure side (e.g., the first physical area 120A) of the point of access (e.g., the first point of access 118A), the circuitry 202 may determine the first severity score for the at least one tag as, for example, "20", and the corresponding DHO event may be resolved. The circuitry 202 may control rendering of the second information on the user interface based on the first severity score. The second information may indicate a resolution of the DHO event. A person having ordinary skill in the art will understand that the first severity scores determined based on different tags may be same or different from each other.

Referring back to FIG. 6A, at 608, a severity score may be determined as a maximum of the first severity score, the second severity score, and a specific score. The circuitry 202 may be configured to determine a severity score for the DHO event as the maximum of the first severity score, the second severity score, and the specific score, based on the detection of the non-occurrence of the DHO canceled event within the fifth time period from the time of occurrence of the DHO event. The specific score may be greater than the threshold score. The specific score may be, for example, "80". The specific score may be a predefined score set by the circuitry 202 based on a user input received through the output device 112 (or the electronic device 102). In an example, the circuitry 202 may determine the severity score as "80" for the DHO event, in a case where the first severity score may be "15", the second severity score may be "60", and the specific score may be "80". In another example, the circuitry 202 may determine the severity score as "90" for the DHO event, in a case where the first severity score may be "15", the second severity score may be "90", and the specific score may be "80". The circuitry 202 may control rendering of the third information on the user interface based on the detection of the non-occurrence of the DHO canceled event within the fifth time period and the determined severity score that is the maximum of the first severity score, the second severity score, and the specific score. The third information may indicate that the DHO event is not resolved and is pending for review for the operator.

In an example, the circuitry 202 may determine that the requested video data corresponding to the time of occurrence the DHO event may be unavailable or may be not returned from the server 106 (or the database 108, via the server 106) or at least one imaging device of the set of imaging devices 110A, 110B, 110C, and 110D. The circuitry 202 may determine the second severity score (for example, "80") for the DHO event, based on the determination that the requested video data may be unavailable or may be not returned.

Figure 7:
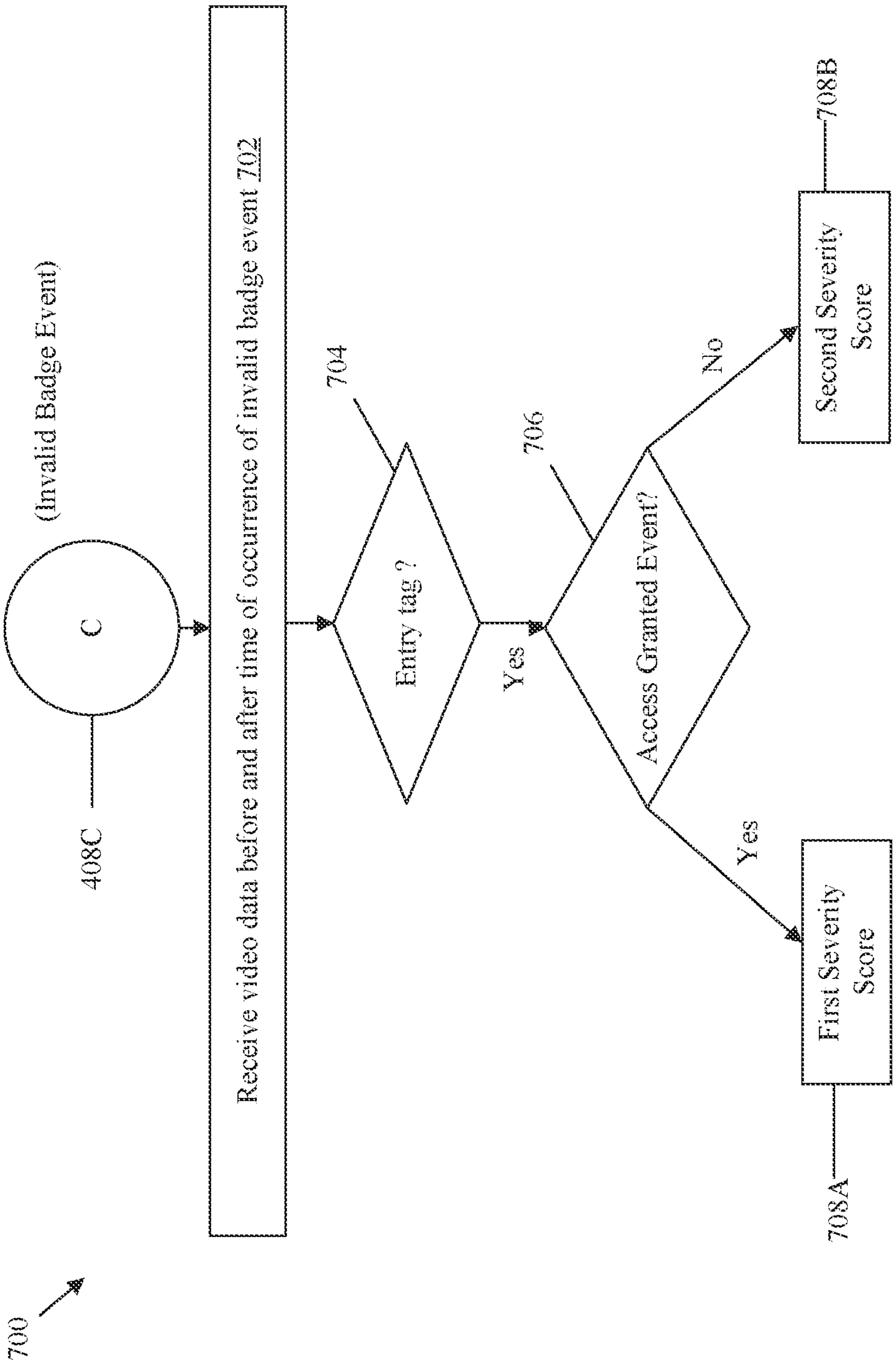
FIG. 7 is a flowchart that illustrates operations of an exemplary method for artificial intelligence based resolution of an invalid badge event, in accordance with an embodiment of the disclosure.

FIG. 7 is a flowchart that illustrates operations of an exemplary method for artificial intelligence based resolution of an invalid badge event, in accordance with an embodiment of the disclosure. FIG. 7 is explained in conjunction with elements from FIG. 1, FIG. 2, FIG. 3, FIG. 4, FIG. 5A, FIG. 5B, FIG. 6A, and FIG. 6B. With reference to FIG. 7, there is shown an exemplary flowchart 700 that provides operations from 408C to 708B (including, for example, 408C, 702, 704, 706, and 708A-708B), as described herein. The operations from 408C to 708B may be implemented, for example, by the electronic device 102 of FIG. 1 or the circuitry 202 of FIG. 2. Control starts at 408C and passes to 702.

At 702, video data corresponding to a sixth time period before a time of occurrence of the invalid badge event and a seventh time period after the time of occurrence of the invalid badge event may be received. The circuitry 202 may be configured to transmit a request to the server 106 (or the database 108, via the server 106) or at least one imaging device of the set of imaging devices 110A, 110B, 110C, and 110D to receive the video data corresponding to the sixth time period before the time of occurrence of the invalid badge event and the seventh time period after the time of occurrence of the invalid badge event.

At 704, at least one tag that may indicate an entry of the at least one person through the point of access may be determined. The circuitry 202 may determine the at least one tag that may indicate the entry of the at least one person through the point of access, by analysis of the video data. With reference to FIG. 1, for example, the second person 124B may enter into the second physical area 120B through the first point of access 118A. The circuitry 202 may receive the video data captured by, for example, the imaging device 110A and the imaging device 110B. The circuitry 202 may analyze the video data to detect a movement of the second person 124B. The movement of the second person 124B may be from the unsecure side (e.g., the first physical area 120A) of the first point of access 118A to the secure side (e.g., the second physical area 120B) of the first point of access 118A. The circuitry 202 may determine the at least one tag that may indicate the entry of the second person 124B in the second physical area 120B, based on the detected movement of the second person 124B from the unsecure side of the first point of access 118A to the secure side of the first point of access 118A.

At 706, one of an occurrence or a non-occurrence of an access granted event associated with the point of access (such as, the first point of access 118A or the second point of access 118B) may be detected. The circuitry 202 may detect one of the occurrence or the non-occurrence of the access granted event based on a difference between a time of occurrence of the access granted event associated with the point of access and the time of occurrence of the invalid badge event. For example, the circuitry 202 may detect the occurrence of the access granted event associated with the point of access in a case where the difference between the time of occurrence of the access granted event and the time of occurrence of the invalid badge event is less than or equal to the second time period (for example, 5 seconds). The circuitry 202 may detect the non-occurrence of the access granted event associated with the point of access in a case where the difference is greater than the second time period.

At 708A, a first severity score indicating a level of authenticity of the invalid badge event may be determined, in case of the detection of the occurrence of the access granted event (at 706). The circuitry 202 may determine the first severity score for the invalid badge event based on the detection of the occurrence of the access granted event associated with the point of access and the at least one tag that may indicate the entry of the at least one person through the point of access. The first severity score may be less than or equal to the threshold score. For example, the first severity score may be "20". The circuitry 202 may control rendering of the second information on the user interface based on the first severity score. The second information may indicate a resolution of the invalid badge event.

At 708B, a second severity score indicating a level of authenticity of the invalid badge event may be determined, in case of the detection of the non-occurrence of the access granted event (at 706). The circuitry 202 may determine the second severity score for the invalid badge event based on the detection of the non-occurrence of the access granted event associated with the point of access and the at least one tag that may indicate the entry of the at least one person through the point of access. The second severity score may be greater than the threshold score. For example, the second severity score may be "70". The circuitry 202 may control rendering of the third information on the user interface based on the second severity score. The third information may indicate that the invalid badge event is not resolved and is pending for review for the operator.

In an example, the circuitry 202 may determine that the requested video data corresponding to the time of occurrence of the invalid badge event may be unavailable or may be not returned from the server 106 (or the database 108, via the server 106) or at least one imaging device of the set of imaging devices 110A, 110B, 110C, and 110D. The circuitry 202 may determine the first severity score (for example, "45") for the invalid badge event, based on the determination that the requested video data may be unavailable or may be not returned and the detection of the occurrence of the access granted event associated with the point of access. The circuitry 202 may determine the second severity score (for example, "70") for the invalid badge event, based on the determination that the requested video data may be unavailable or may be not returned and the detection of the non-occurrence of the access granted event associated with the point of access.

Figure 8:
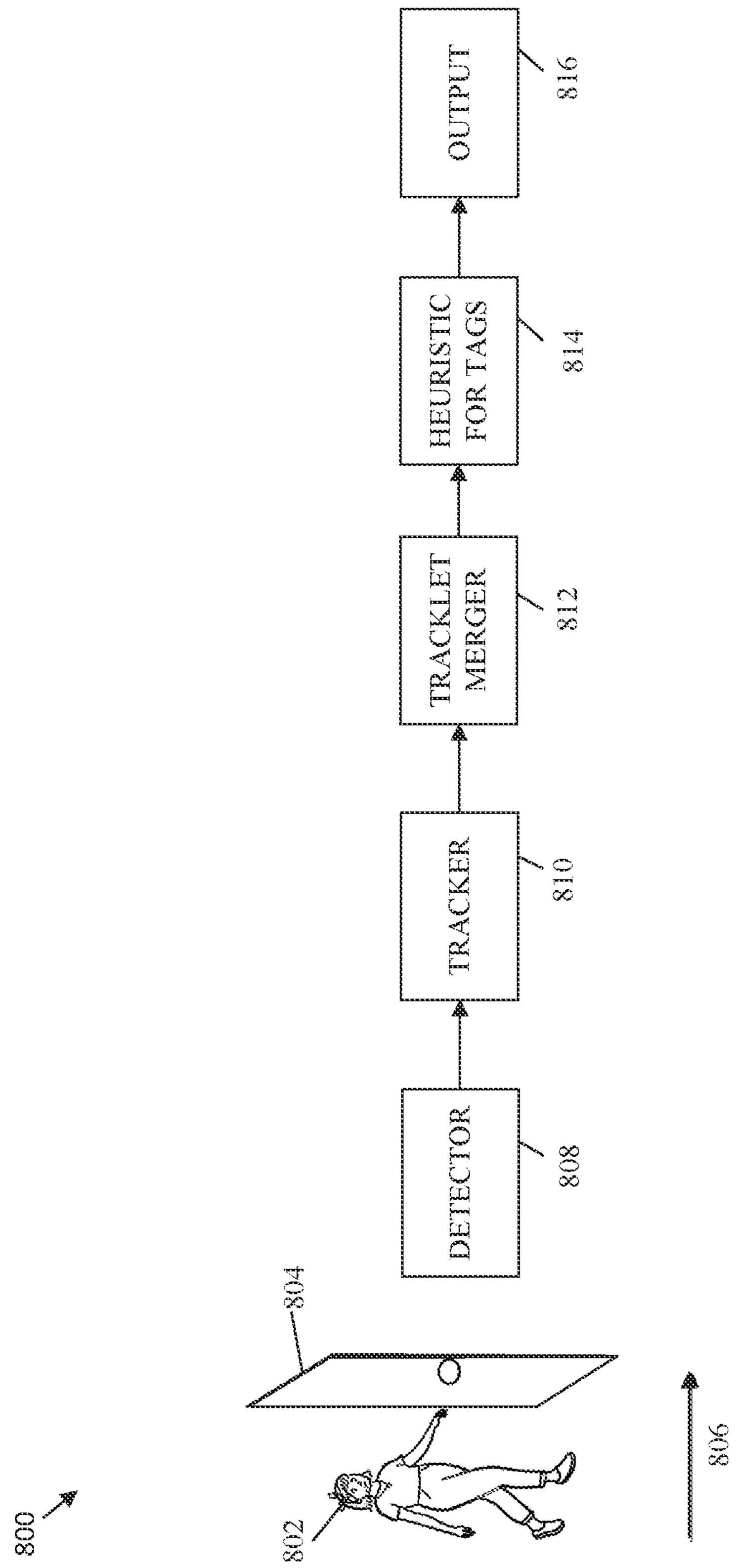
FIG. 8 is a diagram that illustrates an exemplary processing pipeline for determination of one or more tags based on computer vision, in accordance with an embodiment of the disclosure.

FIG. 8 is a diagram that illustrates an exemplary processing pipeline for determination of one or more tags based on computer vision, in accordance with an embodiment of the disclosure. FIG. 8 is explained in conjunction with elements from FIG. 1, FIG. 2, FIG. 3, FIG. 4, FIG. 5A, FIG. 5B, FIG. 6A, FIG. 6B, and FIG. 7. With reference to FIG. 8, there is shown an exemplary processing pipeline 800 that illustrates exemplary processing blocks from 808 to 814. The operations associated with the exemplary processing blocks 808 to 814 may be executed by any computing system, for example, by the electronic device 102 of FIG. 1 or by the circuitry 202 of FIG. 2. In FIG. 8, there is further shown, a person 802 in the vicinity of a point of access 804. The person 802 may, for example, move in a direction 806 in the vicinity of the point of access 804, towards the point of access 804. The person 802 may be, for example, the first person 124A, the second person 124B, the third person 124C, or the fourth person 124D. The point of access 804 may be, for example, the first point of access 118A or the second point of access 118B.

At 808, an operation of person detection may be executed. The circuitry 202 may, for example, apply the AI model 102A (e.g., an object detector model, such as, a convolution neural network model) on the received video data. The AI model 102A may be a computer vision model. The circuitry 202 may detect the person 802 in the video data based on the application of the computer vision model.

At 810, an operation of tracking may be executed. The circuitry 202 may, in real time, track a movement of the detected person 802 in a plurality of image frames of the video data to generate tracklets. Each of the tracklets may include a fragment or a part of a track followed by the detected person 802. The circuitry 202 may, for example, apply the AI model 102A (e.g., an object tracker or motion tracker model) to track a path that may be traversed by the detected person 802 towards the point of access 804.

At 812, an operation of tracklet merger may be executed. The circuitry 202 may merge the generated tracklets associated with the detected person 802 based on pixel information of each of the tracklets. For example, the circuitry 202 may determine re-identification (ReID) features from each of the tracklets. The circuitry 202 may determine similarities between the tracklets based on the ReID features. The circuitry 202 may merge the tracklets based on the determined similarities, and thereby perform tracklet merger.

At 814, an operation of application of heuristic for tags may be executed. The circuitry 202 may determine at least one tag based on the merged tracklets that may include the track followed by the detected person 802. For example, the circuitry 202 may determine the at least one tag that may indicate that an exit of the detected person 802 takes place from a physical area (such as, the first physical area 120A or the second physical area 120B) through the point of access 804, based on the merged tracklets. Thus, heuristics for determination of tags may be applied on the merged tracklets to determine the relevant tags.

At 816, an operation of output of the at least one tag may be performed. The circuitry 202 may output the at least one tag. A person having ordinary skill in the art will understand that the at least one tag may, but is not limited to, indicate an entry of the person 802 through the point of access 804, or a loitering of the person 802 on one of a secure side or an unsecure side of the point of access 804.

FIG. 9 is a diagram that illustrates an exemplary table including first information that may be rendered on a user interface, in accordance with an embodiment of the disclosure. FIG. 9 is explained in conjunction with elements from FIG. 1, FIG. 2, FIG. 3, FIG. 4, FIG. 5A, FIG. 5B, FIG. 6A, FIG. 6B, FIG. 7, and FIG. 8. With reference to FIG. 9, there is shown an exemplary table 900 that may include the first information that may be rendered on a user interface of the output device 112 (or the electronic device 102).

For example, the first information may include, but is not limited to, one of second information indicating a resolution of an alarm event associated with a point of access (such as, the first point of access 118A or the second point of access 118B) or third information indicating the alarm event is pending for review for an operator associated with a premises. In FIG. 9, a first column of the table 900 may include a status corresponding to each type of alarm events (such as, the DFO event, the DHO event, the invalid access level event, or the invalid badge event). The status may include the second information (for example, an indication that the alarm is resolved) or the third information (for example, an indication that the alarm is pending for review of an operator). Further, as shown in FIG. 9, a second column of the table 900 may include a severity score corresponding to each type of alarm events, a third column of the table 900 may include each type of alarm events, a fourth column of the table 900 may include a time stamp indicating a date and a time of occurrence of each type of alarm events, and a fifth column of the table 900 may include location information associated with the point of access corresponding to each type of alarm events.

In an example, a first row 902A of the table 900 may indicate the type of alarm event as a DFO event, the severity score for the DFO event as "75", the status of the DFO event as pending, a first time stamp (such as, date-time-1), and first location information (such as location 1, gate 1) associated with the point of access for which the DFO event is detected. The first time stamp may indicate, for example, a date (such as, 23 May 2023) and a time (such as, 03:45:01 AM) of occurrence of the DFO event. The first location information may include, for example, an identification number or a name assigned to the point of access to a physical area (such as, the first physical area 120A or the second physical area 120B) or may include an identification number or a name assigned to the physical area. For example, the first location information (such as, location 1, gate 1) may indicate "server room, gate no. 1".

A second row 902B of the table 900, as shown in FIG. 9, may indicate the type of alarm event as a DFO event, the severity score for the DFO event as "15", the status of the DFO event as resolved, a second time stamp (such as, date-time-2), and second location information (such as, location 2, gate 2) associated with the point of access for which the DFO event is detected. A third row 902C of the table 900 may indicate the type of alarm event as a DHO event, the severity score for the DHO event as "80", the status of the DHO event as pending, a third time stamp (such as, date-time-3), and third location information (such as location 3, gate 3) associated with the point of access for which the DHO event is detected. A fourth row 902D of the table 900, as shown in FIG. 9, may indicate the type of alarm event as a DHO event, the severity score for the DHO event as "20", the status of the DHO event as resolved, a fourth time stamp (such as, date-time-4), and fourth location information (such as location 4, gate 4) associated with the point of access for which the DHO event is detected. A fifth row 902E of the table 900 may indicate the type of alarm event as an invalid badge event, the severity score for the invalid badge event as "20", the status of the invalid badge event as resolved, a fifth time stamp (such as, date-time-5), and fifth location information (such as location 5, gate 5) associated with the point of access for which the invalid badge event is detected. A sixth row 902F of the table 900 may indicate the type of alarm event as an invalid badge event, the severity score for the invalid badge event as "65", the status of the invalid badge event as pending, a sixth time stamp (such as, date-time-6), and sixth location information (such as location 6, gate 6) associated with the point of access for which the invalid badge event is detected. A seventh row 902G of the table 900 may indicate the type of alarm event as an invalid access level event, the severity score for the invalid access level event as "80", the status of the invalid access level event as pending, a seventh time stamp (such as, date-time-7), and seventh location information (such as location 7, gate 7) associated with the point of access for which the invalid access level event is detected.

Figure 10:
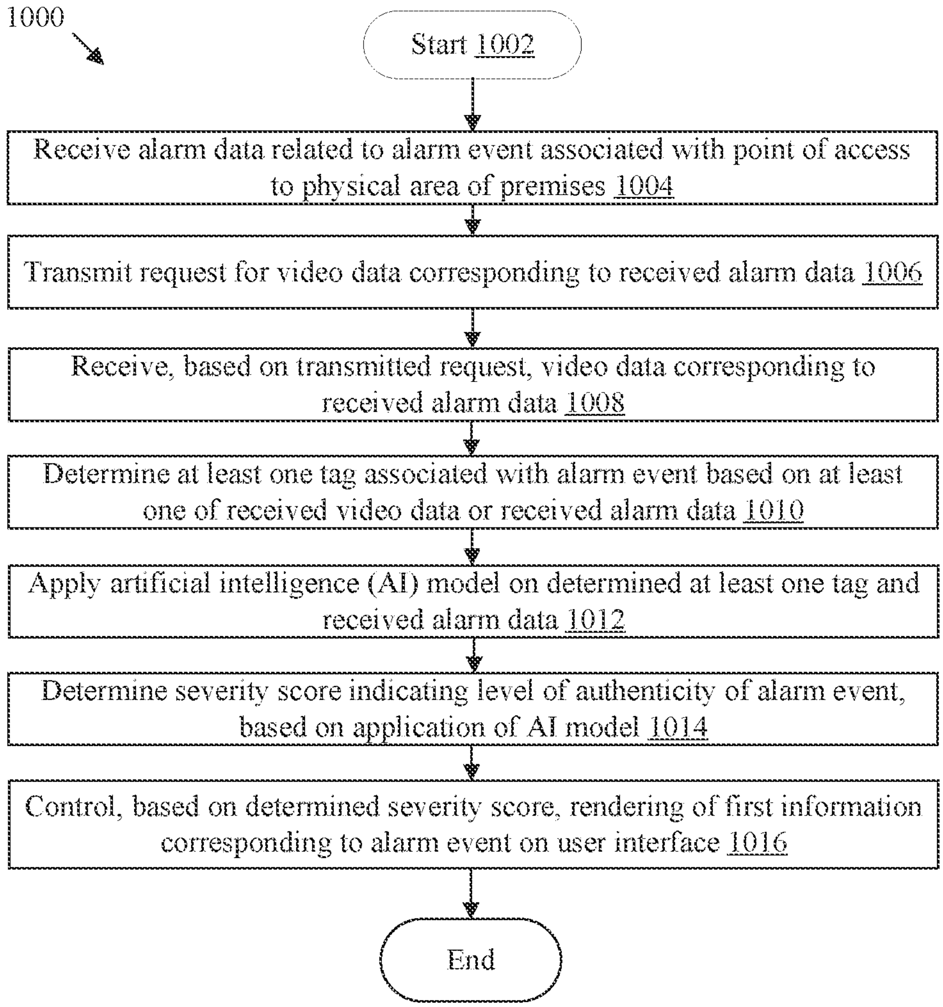
FIG. 10 is a flowchart that illustrates operations of an exemplary method for artificial intelligence based resolution of security alarm events using video data, in accordance with an embodiment of the disclosure.

FIG. 10 is a flowchart that illustrates operations of an exemplary method for artificial intelligence based resolution of security alarm events using video data, in accordance with an embodiment of the disclosure. FIG. 10 is described in conjunction with elements from FIG. 1, FIG. 2, FIG. 3, FIG. 4, FIG. 5A, FIG. 5B, FIG. 6A, FIG. 6B, FIG. 7, FIG. 8, and FIG. 9. With reference to FIG. 10, there is shown a flowchart 1000. The flowchart 1000 may include operations from 1002 to 1016 and may be implemented by the electronic device 102 of FIG. 1 or by the circuitry 202 of FIG. 2. The flowchart 1000 may start at 1002 and proceed to 1004.

At 1004, alarm data related to at least one alarm event associated with at least one point of access (such as, the first point of access 118A or the second point of access 118B) may be received. The circuitry 202 may be configured to receive the alarm data related to the at least one alarm event associated with the at least one point of access. Details related to the reception of the alarm data are provided, for example, in FIG. 3 (at 302).

At 1006, a request for video data may be transmitted. The circuitry 202 may be configured to transmit the request for the video data to a server 106 (or the database 108, via the server 106) or the at least one imaging device of a set of imaging devices 110A, 110B, 110C, and 110D, based on the received alarm data. Details related to the reception of the alarm data are provided, for example, in FIG. 3 (at 304), FIG. 5A, FIG. 6A, and FIG. 7.

At 1008, the video data may be received. The circuitry 202 may be configured to receive the video data in response to the transmitted request. The video data may include, for example, at least one point of access (such as the first point of access 118A or the second point of access 118B) and at least one person (such as the first person 124A, the second person 124B, the third person 124C, or the fourth person 124D) in the vicinity of the at least one point of access. Details related to the reception of the video data are further provided, for example, in FIG. 3 (at 306), FIG. 5A, FIG. 6A, and FIG. 7.

At 1010, at least one tag associated with the at least one alarm event may be determined based on at least one of the received video data or the received alarm data. The circuitry 202 may be configured to analyze the received video data and determine at least one tag based on the analysis of the received video data 306A. The determined at least one tag may indicate one of an entry of the at least one person through the at least one point of access, an exit of the at least one person through the at least one point of access, a loitering of the at least one person on a secure side of the at least one point of access, or a loitering of the at least one person on an unsecure side of the at least one point of access. Details related to the determination of the at least one tag are further provided, for example, in FIG. 3 (at 308), FIG. 5B, and FIG. 6B.

At 1012, an AI model may be applied on the determined at least one tag and the received alarm data. The circuitry 202 may be configured to apply the AI model 102A on the determined at least one tag and the received alarm data. Details related to the application of the AI model 102A are further provided, for example, in FIG. 3 (at 310), FIG. 5B, and FIG. 6B.

At 1014, a severity score indicating a level of authenticity of the at least one alarm event may be determined based on the application of the AI model 102A. The circuitry 202 may be configured to determine the severity score based on the application of the AI model 102A. The circuitry 202 may determine different severity scores for different types of alarm events (such as, a DFO event, a DHO event, an invalid access level event, or an invalid badge event). The circuitry 202 may determine whether the severity score is less than or equal to a threshold score (for example, "50"), or greater than the threshold score. Details related to the determination of the severity score are further provided, for example, in FIG. 3 (at 312), FIG. 4, FIG. 5A, FIG. 5B, FIG. 6A, FIG. 6B, and FIG. 7.

At 1016, control of rendering of first information corresponding to the at least one alarm event on a user interface may be executed based on the determined severity score. The circuitry 202 may be configured to control rendering of first information on the user interface of the output device 112 based on the determined severity score. The first information may include, but is not limited to, the determined severity score, a type of the at least one alarm event, a time of occurrence of the at least one alarm event, and location information associated with the at least one point of access (such as, the first point of access 118A or the second point of access 118B). The first information may also include, but is not limited to, second information indicating a resolution of the at least one alarm event or third information indicating the at least one alarm event is pending for review for an operator. The circuitry 202 may control rendering of the second information on the user interface in a case where the severity score is less than or equal to the threshold score. The circuitry 202 may control rendering of the third information on the user interface in a case where the severity score is greater than the threshold score. Details related to the rendering of the first information are further provided, for example, in FIG. 3 (at 314), FIG. 5A, FIG. 5B, FIG. 6A, FIG. 6B, FIG. 7, and FIG. 9. Control may pass to end.

Although the flowchart 1000 is illustrated as discrete operations, such as, 1004, 1006, 1008, 1010, 1012, 1014, and 1016, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include reception of alarm data related to an alarm event associated with a point of access (for example, the first point of access 118A or the second point of access 118B of FIG. 1) to a physical area (for example, the first physical area 120A or the second physical area 120B of FIG. 1) of a premises. The operations may further include transmission of a request for video data to a server (for example, the server 106 of FIG. 1) or at least one imaging device (for example, the set of imaging devices 110A, 110B, 110C, and 110D of FIG. 1), based on the received alarm data. The operations may further include reception of the video data in response to the transmitted request. The operations may further include determination of at least one tag associated with the alarm event based on at least one of the received video data or the received alarm data. The operations may further include application of an AI model (for example, the AI model 102A of FIG. 1) on the determined at least one tag and the received alarm data. The operations may further include determination of a severity score indicating a level of authenticity of the alarm event based on the application of the AI model 102A. The operations may further include control of rendering of first information corresponding to the alarm event on a user interface based on the determined severity score. The first information may include, but is not limited to, the determined severity score, a type of the alarm event, a time of occurrence of the alarm event, and location information associated with the point of access (for example, the first point of access 118A or the second point of access 118B of FIG. 1). The first information may also include, but is not limited to, second information indicating a resolution of the alarm event or third information indicating the alarm event is pending for review for an operator.

Exemplary aspects of the disclosure may provide an electronic device (such as, the electronic device 102 of FIG. 1) that includes circuitry (such as, the circuitry 202). The circuitry 202 may be configured to receive alarm data related to an alarm event associated with a point of access (for example, the first point of access 118A or the second point of access 118B of FIG. 1) to a physical area (for example, the first physical area 120A or the second physical area 120B of FIG. 1) of a premises. The circuitry 202 may be further configured to transmit a request for video data to a server (for example, the server 106 of FIG. 1) or at least one imaging device (for example, the set of imaging devices 110A, 110B, 110C, and 110D of FIG. 1), based on the received alarm data. The circuitry 202 may be further configured to receive the video data in response to the transmitted request. The circuitry 202 may be further configured to determine at least one tag associated with the alarm event based on at least one of the received video data or the received alarm data. The circuitry 202 may be further configured to apply an AI model (for example, the AI model 102A of FIG. 1) on the determined at least one tag and the received alarm data. The circuitry 202 may be further configured to determine a severity score indicating a level of authenticity of the alarm event based on the application of the AI model 102A. The circuitry 202 may be further configured to control rendering of first information corresponding to the alarm event on a user interface based on the determined severity score.

In an embodiment, the first information may include, but is not limited to, second information indicating a resolution of the alarm event or third information indicating the at least one alarm event is pending for review for an operator associated with the premises.

In an embodiment, the circuitry 202 may be further configured to control rendering of the second information in a case where the determined severity score is less than a threshold score, and control rendering of the third information in a case where the determined severity score is greater than the threshold score.

In an embodiment, the rendered first information may include at least one of the determined severity score or a type of the alarm event.

In an embodiment, the circuitry 202 may be further configured to analyze the received video data to detect a movement of at least one person (for example, the first person 124A, the second person 124B, the third person 124C, or the fourth person 124D) in a vicinity of the point of access to the physical area, and determine the at least one tag based on the detected movement of the at least one person. The received video data may include the at least one person.

In an embodiment, the alarm data may include at least one of a type of the alarm event or a time of occurrence of the alarm event.

In an embodiment, the type of the alarm event may include one of a door forced open (DFO) event, a door held open (DHO) event, an invalid access level event, or an invalid badge event.

In an embodiment, the determined at least one tag may indicate one of an entry of at least one person through the point of access, an exit of the at least one person through the point of access, a loitering of the at least one person on a secure side of the point of access, or a loitering of the at least one person on an unsecure side of the point of access.

In an embodiment, the circuitry 202 may be further configured to detect, based on the DFO event and the alarm data, one of an occurrence or a non-occurrence of an access granted event associated with the point of access. The circuitry 202 may be further configured to determine a first severity score based on the determined at least one tag that may indicate the entry of the at least one person through the point of access and the detection of the occurrence of the access granted event. The circuitry 202 may be further configured to determine a second severity score greater than the first severity score based on the determined at least one tag that may indicate the entry of the at least one person through the point of access and the detection of the non-occurrence of the access granted event.

In an embodiment, the circuitry 202 may be further configured to detect one of the occurrence or the non-occurrence of the access granted event based on a difference between a time of occurrence of the access granted event and a time of occurrence of the DFO event.

In an embodiment, the circuitry 202 may be further configured to determine a first severity score based on the DFO event and the determined at least one tag that may indicate one of the exit of the at least one person through the point of access or the loitering of the at least one person on the secure side of the point of access. The circuitry 202 may be further configured to determine a second severity score greater than the first severity score based on the DFO event and the determined at least one tag that may indicate the loitering of the at least one person on the unsecure side of the point of access.

In an embodiment, the circuitry 202 may be further configured to detect one of an occurrence or a non-occurrence of a DFO canceled event within a specific time period from a time of occurrence of the DFO event. The circuitry 202 may be further configured to receive, based on the detection of the occurrence of the DFO canceled event, the video data until a time of occurrence of the DFO canceled event. The circuitry 202 may be further configured to determine the severity score as a maximum of the first severity score, the second severity score, and a specific score, based on the detection of the non-occurrence of the DFO canceled event.

In an embodiment, the circuitry 202 may be further configured to detect, based on the DHO event and the alarm data, one of an occurrence or a non-occurrence of an access granted event associated with the point of access. The circuitry 202 may be further configured to determine a first severity score based on one of the determined at least one tag that may indicate the entry of the at least one person through the point of access and the detection of the occurrence of the access granted event, or the determined at least one tag that may indicate one of the exit of the at least one person through the point of access, the loitering of the at least one person on the secure side of the point of access, or the loitering of the at least one person on the unsecure side of the point of access. The circuitry 202 may be further configured to determine a second severity score greater than the first severity score based on the determined at least one tag that indicates the entry of the at least one person through the point of access and the detection of the non-occurrence of the access granted event.

In an embodiment, the circuitry 202 may be further configured to detect one of an occurrence or a non-occurrence of a DHO canceled event within a specific time period from a time of occurrence of the DHO event. The circuitry 202 may be further configured to receive, based on the detection of the occurrence of the DHO canceled event, the video data until a time of occurrence of the DHO canceled event. The circuitry 202 may be further configured to determine the severity score as a maximum of the first severity score, the second severity score, and a specific score, based on the detection of the non-occurrence of the DHO canceled event.

In an embodiment, the determined severity score may be equal to a specific score based on the invalid access level event.

In an embodiment, the circuitry 202 may be further configured to detect, within a specific time period from a time of occurrence of the invalid badge event, one of an occurrence or a non-occurrence of an access granted event associated with the point of access. The circuitry 202 may be further configured to determine a first severity score based on the detection of the occurrence of the access granted event. The circuitry 202 may be further configured to determine a second severity score greater than the first severity score based on the detection of the non-occurrence of the access granted event.

In an embodiment, the circuitry 202 may be further configured to detect, within a specific time period from a time of occurrence of the alarm event, one of an occurrence or a non-occurrence of a resolving event corresponding to the alarm event. The circuitry 202 may be further configured to determine a first severity score based on the detection of the occurrence of the resolving event. The circuitry 202 may be further configured to determine a second severity score greater than the first severity score based on the detection of the non-occurrence of the resolving event.

In an embodiment, the alarm event may include one of a line error active event, an open line alarm active event, a shorted line alarm active event, a grounded loop alarm active event, a power failure event, or a communication lost event, and the resolving event may indicate one of a resolution or a cancelation of the alarm event.

The present disclosure may be realized in hardware, or a combination of hardware and software. The present disclosure may be realized in a centralized fashion, in at least one computer electronic device, or in a distributed fashion, where different elements may be spread across several interconnected computer electronic devices. A computer electronic device or other apparatus adapted for carrying out the methods described herein may be suited. A combination of hardware and software may be a general-purpose computer electronic device with a computer program that, when loaded and executed, may control the computer electronic device such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer electronic device is able to carry out these methods. Computer program, in the present context, means any expression, in any language, code or notation, of a set of instructions intended to cause an electronic device with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. An electronic device, comprising:
circuitry configured to:
receive alarm data related to an alarm event associated with a point of access to a physical area of a premises;
transmit a request for video data corresponding to the received alarm data;
receive, based on the transmitted request, the video data corresponding to the received alarm data;
determine at least one tag associated with the alarm event based on at least one of the received video data or the received alarm data;
apply an artificial intelligence (AI) model to the determined at least one tag and the received alarm data;
determine a severity score indicating whether the alarm event corresponds to a true event or a false event, based on the application of the AI model;
control, based on the determined severity score, rendering of first information corresponding to the alarm event on a user interface, wherein
the first information includes one of:
second information indicating a resolution of the alarm event, or
third information indicating the alarm event is pending for review for an operator associated with the premises,
control rendering of the second information in a case where the determined severity score is less than a threshold score; and
control rendering of the third information in a case where the determined severity score is greater than the threshold score.

2. The electronic device according to claim 1, wherein the rendered first information includes at least one of the determined severity score or a type of the alarm event.

3. The electronic device according to claim 1, wherein the circuitry is further configured to:
analyze the received video data to detect a movement of at least one person in a vicinity of the point of access to the physical area of the premises, wherein the received video data includes the at least one person; and
determine the at least one tag based on the detected movement of the at least one person.

4. The electronic device according to claim 1, wherein the alarm data includes at least one of a type of the alarm event or a time of occurrence of the alarm event.

5. The electronic device according to claim 4, wherein the type of the alarm event includes one of a door forced open (DFO) event, a door held open (DHO) event, an invalid access level event, or an invalid badge event.

6. The electronic device according to claim 5, wherein the determined at least one tag indicates one of:
an entry of at least one person through the point of access,
an exit of the at least one person through the point of access,
a loitering of the at least one person on a secure side of the point of access, or
a loitering of the at least one person on an unsecure side of the point of access.

7. The electronic device according to claim 6, wherein the circuitry is further configured to:
detect, based on the DFO event and the alarm data, one of an occurrence or a non-occurrence of an access granted event associated with the point of access;
determine a first severity score based on the determined at least one tag that indicates the entry of the at least one person through the point of access and the detection of the occurrence of the access granted event; and
determine a second severity score greater than the first severity score based on the determined at least one tag that indicates the entry of the at least one person through the point of access and the detection of the non-occurrence of the access granted event.

8. The electronic device according to claim 7, wherein the circuitry is further configured to detect one of the occurrence or the non-occurrence of the access granted event based on a difference between a time of occurrence of the access granted event and a time of occurrence of the DFO event.

9. The electronic device according to claim 6, wherein the circuitry is further configured to:
determine a first severity score based on the DFO event and the determined at least one tag that indicates one of the exit of the at least one person through the point of access or the loitering of the at least one person on the secure side of the point of access; and
determine a second severity score greater than the first severity score based on the DFO event and the determined at least one tag that indicates the loitering of the at least one person on the unsecure side of the point of access.

10. The electronic device according to claim 9, wherein the circuitry is further configured to:
detect one of an occurrence or a non-occurrence of a DFO canceled event within a specific time period from a time of occurrence of the DFO event;
receive, based on the detection of the occurrence of the DFO canceled event, the video data until a time of occurrence of the DFO canceled event; and
determine the severity score as a maximum of the first severity score, the second severity score, and a specific score, based on the detection of the non-occurrence of the DFO canceled event.

11. The electronic device according to claim 6, wherein the circuitry is further configured to:
detect, based on the DHO event and the alarm data, one of an occurrence or a non-occurrence of an access granted event associated with the point of access;
determine a first severity score based on one of:
the determined at least one tag that indicates the entry of the at least one person through the point of access and the detection of the occurrence of the access granted event, or
the determined at least one tag that indicates one of the exit of the at least one person through the point of access, the loitering of the at least one person on the secure side of the point of access, or the loitering of the at least one person on the unsecure side of the point of access; and
determine a second severity score greater than the first severity score based on the determined at least one tag that indicates the entry of the at least one person through the point of access and the detection of the non-occurrence of the access granted event.

12. The electronic device according to claim 11, wherein the circuitry is further configured to:
detect one of an occurrence or a non-occurrence of a DHO canceled event within a specific time period from a time of occurrence of the DHO event;
receive, based on the detection of the occurrence of the DHO canceled event, the video data until a time of occurrence of the DHO canceled event; and
determine the severity score as a maximum of the first severity score, the second severity score, and a specific score, based on the detection of the non-occurrence of the DHO canceled event.

13. The electronic device according to claim 5, wherein the determined severity score is greater than the threshold score based on the invalid access level event.

14. The electronic device according to claim 5, wherein the circuitry is further configured to:
detect, within a specific time period from a time of occurrence of the invalid badge event, one of an occurrence or a non-occurrence of an access granted event associated with the point of access;
determine a first severity score based on the detection of the occurrence of the access granted event; and
determine a second severity score greater than the first severity score based on the detection of the non-occurrence of the access granted event.

15. The electronic device according to claim 1, wherein the circuitry is further configured to:
detect, within a specific time period from a time of occurrence of the alarm event, one of an occurrence or a non-occurrence of a resolving event corresponding to the alarm event;
determine a first severity score based on the detection of the occurrence of the resolving event; and
determine a second severity score greater than the first severity score based on the detection of the non-occurrence of the resolving event.

16. The electronic device according to claim 15, wherein the alarm event includes one of a line error active event, an open line alarm active event, a shorted line alarm active event, a grounded loop alarm active event, a power failure event, or a communication lost event, and
the resolving event indicates one of the resolution or a cancelation of the alarm event.

17. A method, comprising:
in an electronic device:
receiving alarm data related to an alarm event associated with a point of access to a physical area of a premises;
transmitting a request for video data corresponding to the received alarm data;
receiving, based on the transmitted request, the video data corresponding to the received alarm data;
determining at least one tag associated with the alarm event based on at least one of the received video data or the received alarm data;
applying an artificial intelligence (AI) model to the determined at least one tag and the received alarm data;
determining a severity score indicating whether the alarm event corresponds to a true event or a false event, based on the application of the AI model;
controlling, based on the determined severity score, rendering of first information corresponding to the alarm event on a user interface, wherein
the first information includes one of:
second information indicating a resolution of the alarm event, or
third information indicating the alarm event is pending for review for an operator associated with the premises,
controlling rendering of the second information in a case where the determined severity score is less than a threshold score; and
controlling rendering of the third information in a case where the determined severity score is greater than the threshold score.

18. A non-transitory computer-readable medium having stored thereon, computer-executable instructions that when executed by an electronic device, causes the electronic device to execute operations, the operations comprising:
receiving alarm data related to an alarm event associated with a point of access to a physical area of a premises;
transmitting a request for video data corresponding to the received alarm data;

receiving, based on the transmitted request, the video data corresponding to the received alarm data;

determining at least one tag associated with the alarm event based on at least one of the received video data or the received alarm data;

applying an artificial intelligence (AI) model to the determined at least one tag and the received alarm data;

determining a severity score indicating whether the alarm event corresponds to a true event or a false event, based on the application of the AI model; and controlling, based on the determined severity score, rendering of first information corresponding to the alarm event on a user interface, wherein the first information includes one of:

second information indicating a resolution of the alarm event, or third information indicating the alarm event is pending for review for an operator associated with the premises, controlling rendering of the second information in a case where the determined severity score is less than a threshold score; and controlling rendering of the third information in a case where the determined severity score is greater than the threshold score.

* * * * *